(12) United States Patent
Langholz

(10) Patent No.: US 10,140,001 B2
(45) Date of Patent: Nov. 27, 2018

(54) CONFIGURABLE ELECTRONIC COMMUNICATION ELEMENT

(71) Applicant: Facebook, Inc., Menlo Park, CA (US)

(72) Inventor: Benjamin S. Langholz, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 217 days.

(21) Appl. No.: 14/223,750

(22) Filed: Mar. 24, 2014

(65) Prior Publication Data
US 2015/0268826 A1    Sep. 24, 2015

(51) Int. Cl.
| G06F 3/048 | (2013.01) |
| G06F 3/0484 | (2013.01) |
| G06F 3/0486 | (2013.01) |
| H04L 12/58 | (2006.01) |

(52) U.S. Cl.
CPC ........ G06F 3/04845 (2013.01); G06F 3/0486 (2013.01); G06F 3/04842 (2013.01); G06F 3/04847 (2013.01); H04L 51/10 (2013.01)

(58) Field of Classification Search
None
See application file for complete search history.

(56) References Cited

U.S. PATENT DOCUMENTS

| 2008/0235285 A1* | 9/2008 | Della Pasqua ....... G06Q 10/107 |
| 2009/0079750 A1* | 3/2009 | Waxman ............ G06Q 10/107 345/581 |
| 2012/0059787 A1* | 3/2012 | Brown ................. G06F 17/241 706/52 |
| 2012/0146955 A1* | 6/2012 | Martin-Cocher ..... G06F 3/0236 345/176 |
| 2013/0055112 A1 | 2/2013 | Joseph et al. |
| 2013/0249919 A1* | 9/2013 | Osada .................. G06Q 10/10 345/472 |
| 2014/0019885 A1* | 1/2014 | Jung .................... G06F 3/0481 715/758 |

(Continued)

FOREIGN PATENT DOCUMENTS

| JP | H 09-138767 A | 5/1997 |
| JP | 2001-282417 A | 10/2001 |
| JP | 2002-149151 A | 5/2002 |

(Continued)

OTHER PUBLICATIONS

International Search Report as received in PCT/US2014/034025 dated Dec. 19, 2014.

(Continued)

Primary Examiner — William C Trapanese
(74) Attorney, Agent, or Firm — Keller Jolley Preece

(57) ABSTRACT

One or more embodiments of the disclosure include an electronic communication system that allows a user to select, configure, and send an electronic communication element to another user. For example, an electronic communication element can include a symbol, icon, animation, sound, and/or other elements that can be sent via an electronic communication. In particular, one or more embodiments of the electronic communication system allow a user to configure the electronic communication element to send a customized message to another user with the configured communication element.

20 Claims, 16 Drawing Sheets

(56) References Cited

U.S. PATENT DOCUMENTS

2014/0059448 A1    2/2014  Lee
2015/0268780 A1*  9/2015  Kim ..................... G06F 3/0412
                                                      345/174

FOREIGN PATENT DOCUMENTS

| | | |
|---|---|---|
| JP | 2004-015478 A | 1/2004 |
| JP | 2004-128614 A | 4/2004 |
| JP | 2012-168942 A | 9/2012 |
| JP | 2013-196661 A | 9/2013 |
| JP | 2014-029665 | 2/2014 |
| KR | 10-2010-0133243 | 12/2010 |
| KR | 10-2014-0004510 | 1/2014 |
| WO | WO 2007-008050 | 1/2007 |
| WO | WO 2015/147891 | 10/2015 |

OTHER PUBLICATIONS

Office Action as received in Japanese application 2016-558568, dated Jan. 23, 2018.

* cited by examiner

CONFIGURABLE ELECTRONIC COMMUNICATION ELEMENT

BACKGROUND

1. Technical Field

One or more embodiments relate to systems and methods for providing electronic communication. More specifically, one or more embodiments of the present invention relate to systems and methods of providing a user interface for use in connection with composing and sending an electronic communication.

2. Background and Relevant Art

Computing devices (e.g., computers, tablets, and smart phones) have created numerous ways for people to connect and communicate with one another. For example, a variety of electronic communication systems provide various methods to send and receive electronic messages. For instance, a computing device can allow a user to communicate with other users using text messaging, instant messaging, social network posts, and other forms of electronic communication. In addition, an electronic communication may include a variety of content, including, text, images, video, and/or other data. In general, electronic communication has become one of the most popular ways in which people connect and communicate with one another.

Due to the wide variety of ways in which people can communicate using electronic communication systems, as well as the convenience and mobility of electronic communication, users are often faced with receiving and sending a large number of electronic messages on a daily basis. To increase the efficiency of sending and receiving electronic messages, many conventional electronic communication systems allow a user to include a symbol (e.g., an emoticon) within an electronic message as a shortcut form of communication. A symbol can represent a shortcut form of communication because less user input (e.g., less typing) may be required to include a symbol in an electronic communication compared to communicating the same message using conventional text. Thus, including symbols in an electronic message may allow a user to shortcut the need to type several words, or even sentences.

Although using symbols can increase the efficiency of sending and receiving electronic messages, several disadvantages exist with respect to the conventional use of symbols within electronic communications. For example, users often desire more granularity in the message, sentiment, or thought expressed by conventional symbols. Most conventional symbols, however, are purposefully designed to represent a single message, sentiment, or thought. Thus, when a symbol does not exactly match a user's intended message, the user is forced to either take extra time to enter several words or sentences, or send a symbol that inadequately expresses the user's intended message.

To address the lack of message granularity of conventional symbols, some conventional electronic communications systems include a library that includes a large number of symbols in an attempt to provide the user with a symbol that more closely matches the user's intended message. The symbol libraries, however, can cause the user to scroll or search through a large number of symbols to locate the most appropriate symbol. Unfortunately, the amount of time it takes the user to locate the symbol in the symbol library is usually greater than the amount of time it would have taken for the user to simply type the message in the first place.

In addition, due to the large number of electronic communication system providers, many of which provide a large number of symbols to include in an electronic message, the meanings of many symbols are not clear and may be confusing to users. For example, a user sending an electronic message may select a symbol intending to express a positive sentiment. The user receiving the electronic message, however, may interpret the symbol as expressing a negative sentiment due to the lack of familiarity with the symbol. The confusion created due to the large number of available symbols causes the electronic communication to be less efficient and more frustrating to the users.

Accordingly, there are a number of considerations to be made in improving electronic communications.

SUMMARY

One or more embodiments described below provide benefits and/or solve one or more of the foregoing or other problems in the art with methods and systems for allowing a user to configure an electronic communication element. For example, the principles described herein provide a graphical user interface that allows a user to easily and quickly configure an electronic communication element. Once the user configures the electronic communication element, the graphical user interface further allows the user to quickly and easily send the configured electronic communication element to another user.

Due to the ability to configure an electronic communication element, a user can customize an electronic communication element to accurately represent the user's intended message, sentiment, or thought. In particular, one or more embodiments allow a user to select an electronic communication element that is configurable to indicate varying degrees of a particular sentiment. For example, an electronic communication element can have a design that generally represents a sentiment, message, or thought. Using the methods and systems described herein, the user can then configure the electronic communication element to indicate a particular degree or emphasis of the sentiment, message, or thought expressed through the electronic communication element. Thus, the methods and systems described herein allow a user to customize an electronic communication element to substantially match the exact sentiment, message, or thought the user wishes to convey.

In addition, one or more embodiments provide methods and systems that allow a user to select, configure, and send an electronic communication element efficiently and intuitively compared to the conventional methods of having a user search through large numbers of symbols to find a symbol that most accurately expresses the user's message, sentiment, or thought. In particular, the principles described herein provide a graphical user interface that allows a user to select, configure, and send an electronic communication element with minimal user interaction with the graphical user interface. Thus, compared to conventional methods and systems, one or more embodiments described herein provide a more efficient and intuitive way for a user to send an electronic communication element to another user.

Moreover, and as mentioned above, one or more embodiments provide methods and systems to allow a user to customize an electronic communication element to more accurately express the user's intended message. In turn, one or more embodiments also allow a recipient user of the customized electronic communication element to understand the user's intended message with little or no confusion. For example, a user can customize a familiar electronic communication element to accurately reflect a degree of sentiment associated with the familiar electronic communication element, as compared to conventional systems where the user may have to send an unfamiliar symbol that causes recipient confusion.

Additional features and advantages of will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the invention and are not therefore to be considered to be limiting of its scope, the invention will be described and explained with additional specificity and detail through the use of the accompanying drawings.

DETAILED DESCRIPTION

Figure 1:
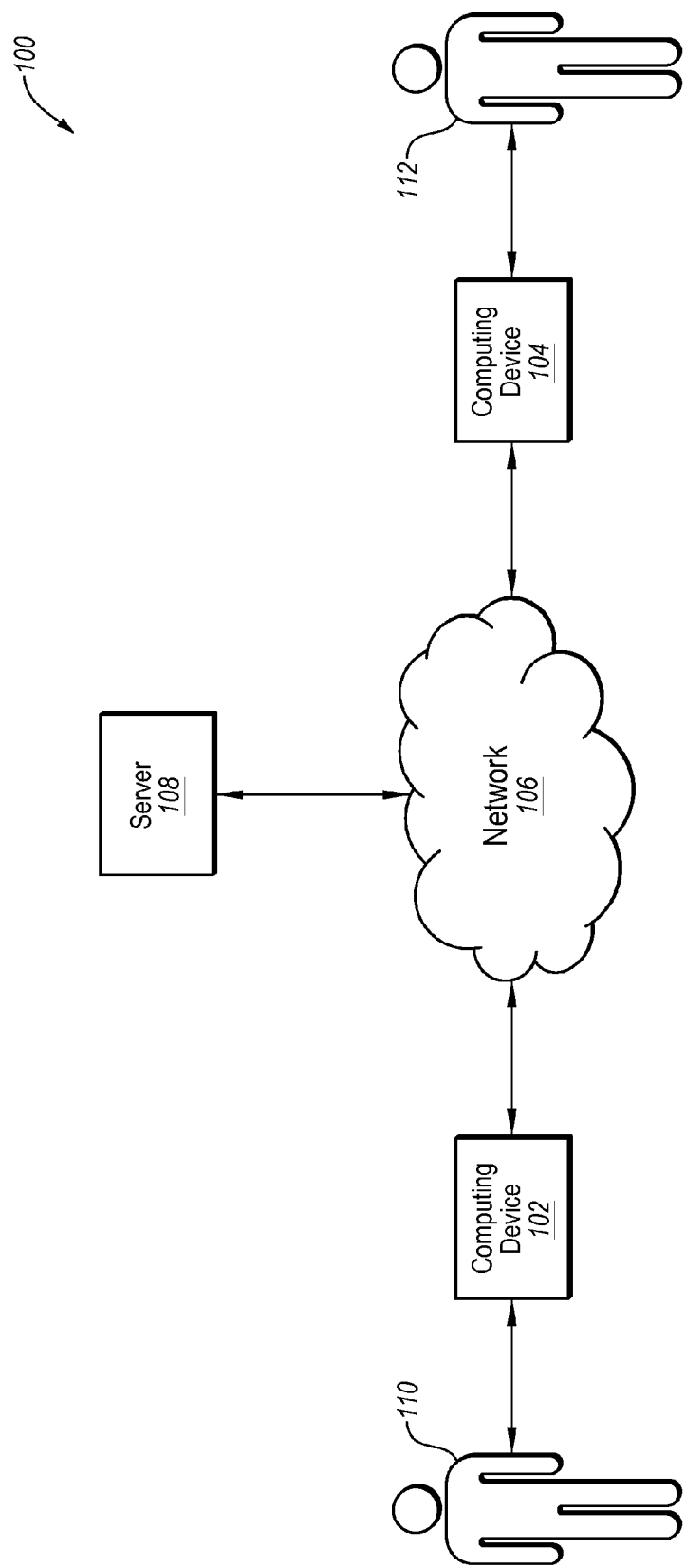
FIG. 1 illustrates a schematic diagram of a network environment in which the methods and systems disclosed herein may be implemented in accordance with one or more embodiments.

One or more embodiments of the present invention include an electronic communication system that allows a user to select, configure, and send an electronic communication element to another user. For example, the electronic communication system allows a user to easily and quickly configure an electronic communication element to send as an electronic communication, or as part of an electronic communication. For instance, an electronic communication element can include a symbol, icon, animation, sound, and/or other feature that can be sent via an electronic communication. In particular, one or more embodiments of the electronic communication system allow a user to select an electronic communication element, configure the electronic communication element, and send the configured electronic communication element to another user.

Due to the ability to configure an electronic communication element, a user can use the electronic communication system to customize an electronic communication element to accurately represent the user's intended message, sentiment, or thought to be expressed by way of the electronic communication element. In particular, the electronic communication system allows a user to configure an electronic communication element to indicate varying degrees of a message, sentiment, or thought expressed by the electronic communication element. For example, an electronic communication element can have a design that generally represents a positive sentiment, message, or thought (e.g., "I like it."). Using the methods and systems described herein, the user can configure the electronic communication element to indicate the degree of the sentiment expressed through the electronic communication element (e.g., "I like it," or "I like it a lot," or "I love it!"). Thus, the methods and systems described herein allow a user to customize an electronic communication element to accurately match the sentiment, message, or thought the user wishes to convey.

In addition, the electronic communication system can provide methods and systems that allow a user to select, configure, and send an electronic communication element efficiently and intuitively. In particular, compared to the conventional methods of having a user search through large numbers of symbols to find a symbol that most accurately expresses the user's intended message, sentiment, or thought, the electronic communication system allows a user to select, configure, and send an electronic communication element to another user with minimal user input. Therefore, compared to conventional methods and systems, one or more embodiments of the electronic communication system can provide a more efficient and intuitive way for a user to send an electronic communication element to another user.

In particular, the efficiency at which a user can use the electronic communication system to select, configure, and send electronic messages can be based in part on a graphical user interface provided by the electronic communication system. For example, the user can interact with the graphical user interface to cause the electronic communication system to select, configure, and send an electronic communication element. In one or more embodiments, the electronic communication system allows a user to select an electronic communication element by way of a interacting with a portion of the graphical user interface. For example, the user can interact with a selectable item associated with the electronic communication element (e.g., touches a touch screen).

After selecting the electronic communication element, the user can cause the electronic communication system to configure the electronic communication element. In one or more embodiments, the electronic communication system configures the electronic communication element upon detecting that the user continues to interact with the selectable item displayed within the graphical user interface (e.g., continues to touch the touch screen). The amount of time in which the user continues to interact with the graphical user interface can be used to determine the configuration for the electronic communication element.

Upon a achieving a desired configuration for the electronic communication element, the user can cause the electronic communication system to send the configured electronic communication element to another user, or in other words, cause the configured electronic communication element to be incorporated into an electronic message that is sent to another user. In one or more embodiments of the present invention, the user can cause the electronic communication system to send the configured electronic communication element by ceasing to interact with the graphical user interface (e.g., ceasing to touch the touch screen). Thus, the user can select, configure, and send an electronic communication element with minimal user interaction with the graphical user interface (e.g., touch, hold, release).

After sending the configured communication element, the configured communication element can be presented to another user. In turn, one or more embodiments of the present invention allow the recipient to receive a configured electronic communication element that is customized to accurately represent the user's intended message with little or no confusion. For example, a user can customize a familiar or popular electronic communication element to accurately reflect a degree of sentiment associated with the familiar electronic communication element, as compared to conventional systems that may provide a recipient with an unfamiliar symbol that causes recipient confusion. The above, as well as additional features and benefits of one or more embodiments of the present invention will be described below in more detail.

As used herein, an electronic communication element (or simply "communication element") refers to any part of an electronic communication that expresses a user message, sentiment, tone, temperament, or thought without the use of conventional written language (e.g., plain text words). For example, a communication element can comprise one or more symbols, icons, emoticons, images, animations, sounds, and/or other content that can be sent via an electronic communication. For instance, a communication element may comprise only an icon. In another instance, however, a single communication element may comprise an icon, animation, and sound. In addition, although a communication element does not use conventional written language, an electronic communication can comprise both conventional written language, as well as one or more communication elements (e.g., an instant message may contain the message: "Have a good day! ☺ "). Alternatively, an electronic communication can comprise only a communication element (e.g., an instant message can contain the message: "☺ "). Multiple communication elements, as well as different types of communication elements, can be included in a single electronic communication.

FIG. 1 is a schematic diagram illustrating an example system 100, within which one or more embodiments of an electronic communication system (or simply "communication system") can be implemented. As illustrated in FIG. 1, system 100 can include computing devices 102, 104, a network 106, and a server 108. The computing devices 102, 104, the network 106, and the server 108 may be communicatively coupled, as shown in FIG. 1. Although FIG. 1 illustrates a particular arrangement of the computing devices 102, 104, the network 106, and the server 108, various additional arrangements are possible. For example, the computing devices 102, 104 may directly communicate with the server 108, bypassing network 106. Or alternatively, the computing devices 102, 104 may directly communicate with each other.

The computing devices 102, 104, the network 106, and the server 108 may communicate using any communication platforms and technologies suitable for transporting data and/or communication signals, including any known communication technologies, devices, media, and protocols supportive of remote data communications, examples of which will be described in more detail below with respect to FIGS. 7-8. In addition, in certain embodiments, computing devices 102, 104 and server 108 may communicate via the network 106, which may include one or more networks as described further below with respect to FIGS. 7-8.

Server 108 may generate, store, receive, and transmit electronic communication data. For example, server 108 may receive an electronic communication from the computing device 102 and send the received electronic communication to the computing device 104. In particular, the server 108 can transmit electronic messages between one or more users of the system 100. In one example, server 108 can host a social network. In another example, the server 108 is a communication server, such as an instant message server. Regardless, server 108 can be configured to receive a wide range of electronic communication types, including but not limited to, text messages, instant messages, social-networking messages, social-networking posts, emails, and any other form of an electronic communication. Additional details regarding server 108 will be discussed below with respect to FIGS. 7-8.

In addition to the system and network elements of system 100, FIG. 1 illustrates that a user 110 can be associated with the computing device 102, and that a user 112 can be associated with the computing device 104. For example, users 110, 112 may be individuals (i.e., human users). Although FIG. 1 illustrates only two users 110, 112, it is understood that system 100 can include a large number of users, with each of the users interacting with the system 100 through a corresponding number of computing devices. For example, the user 110 can interact with the computing device 102 for the purpose of composing and sending an electronic communication (e.g., instant message). The user 110 may interact with the computing device 102 by way of a user interface on the computing device 102. For example, the user 110 can utilize the user interface to cause the computing device 102 to create and send an electronic communication having a communication element to one or more of the plurality of users of the system 100.

Figure 2:
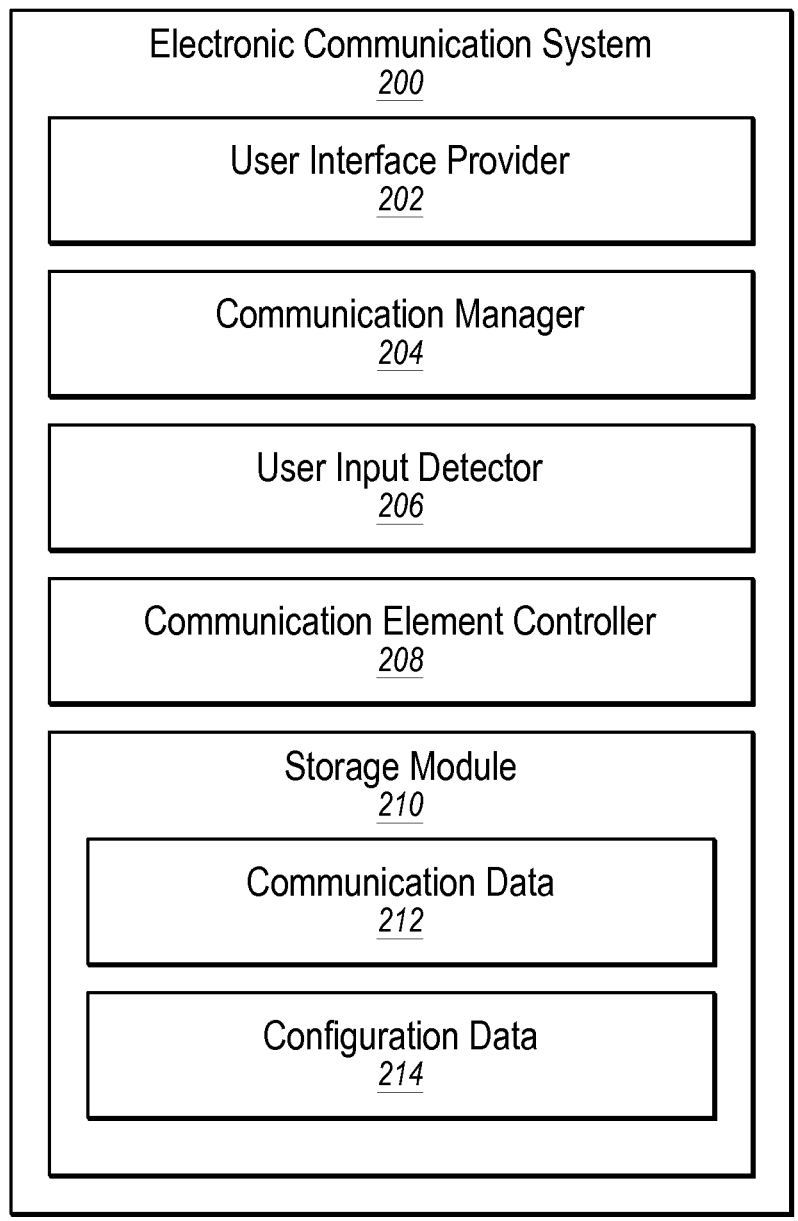
FIG. 2 illustrates a schematic diagram of an electronic communication system in accordance with one or more embodiments.

FIG. 2 illustrates an example embodiment of an electronic communication system 200 (or simply "communication system 200"). The communication system 200 can be implemented in whole or in part on computing device 102. As shown, communication system 200 may include, but is not limited to, a user interface provider 202, a communication manager 204, a user input detector 206, a communication element controller 208, and a storage module 210. Each of the components 202-210 of the communication system 200 may be in communication with one another using any suitable communication technologies. It will be recognized that although components 202-210 are shown to be separate in FIG. 2, any of components 102-110 may be combined into fewer components, such as into a single facility or module, or divided into more components as may serve a particular embodiment.

The components 202-210 can comprise software, hardware, or both. For example, the components 202-210 can comprise one or more instructions stored on a computer-readable storage medium and executable by processors of one or more computing devices. When executed by the one or more processors, the computer-executable instructions of the communication system 110 can cause the computing device(s) 102 and/or 104 to perform the methods described herein. Alternatively, the components 202-210 can comprise hardware, such as a special purpose processing device to perform a certain function or group of functions. Additionally or alternatively, the components 202-210 can comprise a combination of computer-executable instructions and hardware.

As mentioned above, and as shown in FIG. 2, the communication system 200 can include a user interface provider 202. The user interface provider 202 may be configured to provide, manage, and/or control a graphical user interface (or simply "user interface") that allows a user to compose and send electronic communications using the communications system 200, as well view electronic communications received from other users. For example, the user interface provider 202 can provide a user interface configured to facilitate the composition of an electronic communication, such as an instant message. Likewise, the user interface provider 202 can provide a user interface configured to facilitate the display of a received electronic communication.

More specifically, the user interface provider 202 may provide a display (e.g., by way of a display screen associated with the computing device 102) a user interface. For example, the user interface may be composed of a plurality of graphical objects that facilitate electronic communication among a plurality of users. More particularly, the user interface provider 202 may direct a computing device 102 to display a group of graphical objects that enable viewing an electronic communication thread, wherein the thread includes a plurality of electronic messages sent and received among the plurality of users.

In addition, the user interface provider 202 may direct the computing device 102 to display a plurality of graphical objects that facilitate user input for sending an electronic communication. To illustrate, the user interface provider 202 may provide a user interface that allows a user to provide user input to the communication system 200. For example the user interface provider 202 can provide one or more user interfaces that allow a user to input content to be included in an electronic communication. As used herein, "content" refers to any data or information, received as input from the user, to be included as part of an electronic communication. For example, the term "content" will be used herein to generally describe, text, images, digital media, files, location information, and any other data that can be included as part of an electronic communication.

As discussed above, one particular example of content that can be included in an electronic communication is a communication element. The user interface provider 202 can provide a user interface to allow a user to easily and efficiently select a communication element to be included in an electronic communication. For example, the user interface provider 202 can provide one or more selectable items with which a user can interact to add a communication element to an electronic communication. In one or more embodiments, the user interface provider 202 can provide one or more selectable items associated with one or more communication elements that allow a user to select the one or more communication elements for inclusion in an electronic communication.

User interface provider 202 can further facilitate a presentation of a selected communication element prior to sending the communication element. While the communication element is displayed, the user can interact with the user interface to configure the communication element so that the communication element can express or represent a customized message, sentiment, or thought of the user. The user interface provider 202 can continually update the displayed communication element as the communication element undergoes the configuration changes to allow the user to view the configuration, and ultimately select a desired configuration for the communication element.

As mentioned above, and as illustrated in FIG. 2, the communication system 200 may further include a communication manager 204. The communication manager 204 can facilitate receiving and sending data to and from the communication system 200. In particular, communication manager 204 can facilitate sending and receiving electronic communications. For example, the communication manager 204 can package content to be included in an electronic communication and format the electronic communication in any necessary form that is able to be sent through one or more communication channels and using an appropriate communication protocol, as described herein.

Furthermore, the communication manager 204 can be configured to facilitate requesting content from sources outside of communication system 200. To illustrate, upon a user interacting with a selectable item to select a communication element to include in an electronic communication, the communication manager 204 can request the selected communication element (or configurations thereof) from a corresponding source of the communication element. Thus, the communication manager 204 can be configured to request and receive communication elements, or other content, for use within the communication system 200 from sources inside or outside the communication system 200.

As further illustrated in FIG. 2, the communication system 200 includes a user input detector 206. In one or more embodiments, the user input detector 206 can detect, receive, and/or facilitate user input in any suitable manner. In some examples, the user input detector 206 may be configured to detect one or more user interactions. As referred to herein, a "user interaction" means a single input, or combination of inputs, received from a user by way of one or more input devices.

For example, user input detector 206 may be configured to detect a user interaction from a keyboard, mouse, touch screen, or any other input device. In the event a touch screen is utilized, the user input detector 206 may be configured to detect one or more touch gestures that form a user interaction (e.g., swipe gestures, tap gestures, pinch gestures, or reverse pinch gestures) provided by a user by way of the touch screen. In some examples, the detected touch gestures may be provided in relation to and/or directed at one or more items or elements of a user interface presented on the touch screen.

The user input detector 206 may be additionally, or alternatively, configured to receive data representative of a user interaction. For example, user input detector 206 may receive one or more user configurable parameters from a user, one or more user commands from the user, and/or any other suitable user input.

User input and other data received by user input detector 206 may be utilized by communication system 200 to manage, control, and/or facilitate the use and navigation of a user interface. For example, in response to one or more touch gestures detected by user input detector 206, communication system 200 may allow a user to access content to be used in composing an electronic communication. For example, in response to one or more touch gestures detected by the user input detector 206, communication system 200 may allow a user to select a communication element to be included in an electronic communication. Additionally or alternatively, one or more user interactions detected by the user input detector 206 may be used by the communication system 200 to allow a user to configure a communication element. More specifically, in response to one or more touch gestures detected by user input detector 206, communication system 200 may allow a user to select, configure, and send an electronic communication element to another user, as will further be described below.

In addition, in FIG. 2 illustrates that the communication system 200 can include a communication element controller 208. In one or more embodiments of the present invention, the communication element controller 208 configures a communication element to be included in an electronic communication. For example, based on a user interaction detected by the user input detector 206, the communication element controller 208 changes, modifies, enhances, manipulates and/or otherwise configures a communication element, which in turn allows a user to customize the communication element to accurately represent the message, sentiment, or thought the user intends to express with the configured communication element.

The communication element controller 208 can configure the communication element by manipulating one or more characteristics of the communication element. The characteristics of a communication element that the communication element controller 208 can configure may vary from one communication element to the next depending, for example, on the format of the communication element. When the communication element is an icon, for example, the communication element controller 208 can configure characteristics of the icon such as the size, shape, color, opacity, design emphasis, animation, motion effects, shadowing, and other characteristics of the icon. Alternatively, or additionally, the communication element controller 208 can configure only a particular portion of the icon, while leaving another portion unchanged. For example, if the icon was "☺," the communication element controller 208 may configure the mouth portion (e.g., varying between different levels of mouth happiness/sadness), while the other characteristics remain unchanged.

As discussed above, a communication element can include various formats, or combinations of formats. Depending on a particular format, or combination of formats, the characteristics that the communication element controller 208 can configure vary from one communication element to the next. For example, a communication element can comprise audio/sound. In such a case, the communication element controller 208 can configure the type, volume, frequency, tone, speed, duration and or other audio/sound characteristics. In one or more embodiments, a communication element includes two more or more formats (e.g., an icon and sound). In such cases, the communication element controller 208 can configure both the icon and the sound to allow the user to customize the communication element.

Moreover, not only can the communication element controller 208 configure a communication element by modifying characteristics of the communication element, but the communication element controller 208 can also add one or more additional characteristics or formats. For example, as part of configuring an icon, the communication element controller 208 can add an animation effect to the icon. Likewise, the communication element controller 208 can configure a communication element by removing one or more characteristics or formats. For instance, the communication element controller 208 can configure a communication element having a combination format of an icon and a sound by removing the sound portion. Additional examples of the configuring a communication element are discussed in greater detail below with reference to FIGS. 3A-3G.

As discussed above, the communication system 200 can include a storage module 210, as illustrated in FIG. 2. Storage module 210 may maintain communication data 212 representative of data used in connection with communication between a user and one or more other users. For example, communication data 212 can include communication logs, contact lists, content, past communications, and other similar type data that the communication system 200 may use in connection with providing the ability for users to electronically communicate.

Storage module 210 may also maintain configuration data 214 representative of information used to configure one or more communication elements. For example, configuration data 214 may include a data table that matches a communication element, user input, and configuration schemes. For example, a data table may include one or more user inputs associated with a particular communication element. Moreover, the data table may further include one or more configurations to apply to the particular communication element upon the communication system 200 (e.g., the user input detector 208) detecting a specific user interaction. Accordingly, upon the user input detector 206 detecting a user interaction, the communication element controller 208 can use the configuration data 214 to configure the communication element.

As will be described in more detail below, each of the components 202-210 can be used alone and/or in combination with the other components of the communication system 200 to provide a communication element to be included in an electronic communication. In particular, the components 202-210 allow a user to select a communication element, configure the communication element, and send the communication element as part of an electronic communication.

Figure 3A:
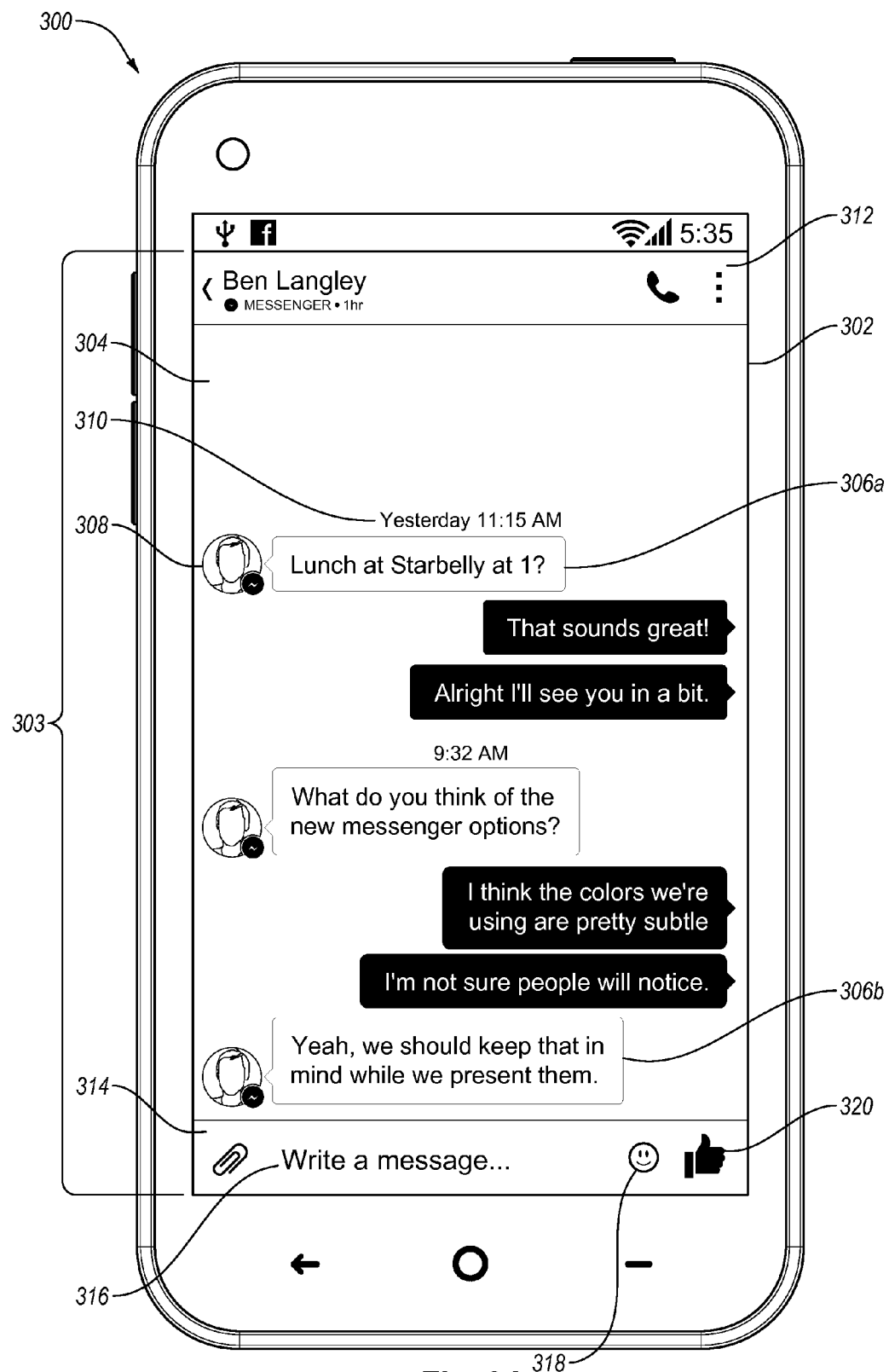
FIG. 3A illustrates an electronic communication user interface in accordance with one or more embodiments.

In some examples, system 200 may be implemented partially or entirely on a computing device (e.g., computing devices 102, 104). For example, FIG. 3A illustrates a computing device 300 that may implement one or more of components 202-214. For example, computing device 300 may perform one or more operations associated with the presentation, processing, and/or management of an electronic communication system as described herein.

As illustrated in FIG. 3A, mobile device 300 is a mobile phone device (e.g., a smartphone). However, in additional or alternative examples, system 200 may be implemented by any other suitable computing device, such as, but not limited to, a tablet device, a handheld device, a laptop or desktop computer, a personal-digital assistant device, and/or any other suitable computing device configured to perform one or more of the processes and/or operations described herein. As illustrated in FIG. 3A, computing device 300 may include and/or be associated with a touch screen 302 by way of which a user interface may be presented and/or by way of which user input may be received and/or detected. Additionally or alternatively, computing device 300 may include any other suitable input device (e.g., a keypad, one or more input buttons).

Regardless of the computing device 300 characteristics, the electronic communication system 200 can be implemented using a variety of systems and methods. FIGS. 3A-4E illustrate example embodiments of a user interface that allows a user to select, configure, and send a communication element within an electronic communication using the principles described herein. As illustrated in FIG. 3A, the touch screen 302 can present a user interface 303 that includes a viewing area 304. In general, the viewing area 304 is the portion of the user interface 303 that facilitates the display electronic communications sent by a user of the computing device 300 and/or received from one or more users.

The viewing area 304 can have various formats and characteristics. For example, and as illustrated in FIG. 3A, the viewing area 304 is configured to include a communication thread between the user of device 300 and another user. In other words, the viewing area 304 displays messages that are sent and received in chronological order. In particular, FIG. 3A illustrates the viewing area 304 includes an oldest message 306a and a newest message 306b. In this case, the viewing area 304 presents the newest message 306b at the bottom of the viewing area 304, and the oldest message 306a at the top of the viewing area 304. As additional messages are sent and received, the older messages move up toward the top of the viewing area 304 until eventually the oldest message is eliminated from view within the viewing area 304. In one or more alternative embodiments, the flow of messages may be top to bottom, or any other direction that is suitable for a particular implementation.

FIG. 3A further illustrates that the messages 306 displayed within the viewing area 304 are displayed in a manner that separates messages sent from messages received. For example, as shown in FIG. 3A, the messages 306 are displayed in the form of "speech bubbles" that are justified to either the left or right side of the viewing area 304. In particular, messages that are sent are justified to the right side, while messages that have been received are justified to the left side. Alternatively, or in addition to, the messages received may have a speech bubble color that is different than a speech bubble color of the messages sent. In the event that there are messages received from two or more other users, a speech bubble color for messages received from one user can be different than a speech bubble color for messages received from another user.

The user interface 303 may include various other characteristics and features to distinguish between messages sent and received and to indicate the particular user that sent the message. For example, and as illustrated in FIG. 3A, the user interface 303 can present a user indicator 308 associated with the user who sent a message 306. The user indicator 308 may be a picture of the user, an icon, a GIF, or any other indicator suitable for identifying a user. Additionally, or alternatively, user interface 303 may present messages 306 adjacent to the name of the user that sent the messages 306. The user interface 303 may include other types of identifying symbols or other organizational features to allow a user to easily determine which messages 306 are sent from which users.

In addition to organizing messages 306 according to the users that sent the messages 306, the user interface 303 can further include a time indicator 310 to further organize the messages 306 according to the time particular messages were sent or received. For example, FIG. 3A illustrates that message 306a is associated with a time indicator 310 indicating the message 306a was received at the noted time. As additional messages are exchanged, additional time indicators 310 can be included in the viewing area 304, as further illustrated in FIG. 3A.

The user interface 303 may also include other features such as a navigation bar 312. For example, and as shown in FIG. 3A, the navigation bar 312 may include information and interactive elements regarding the electronic communication session displayed within the viewing area 304. In particular, the navigation bar 312 can display the name of one or more other users with whom the user of the computer device 300 is communicating. In addition, the navigation bar 312 can include presence information for the one or more other users, as well as additional communication methods that may be available to communicate with the one or other users. A user may interact with the navigation bar 312 in order to navigate to a different communication thread, to a communication system menu, or other interface. One or more interface items may be included in the navigation bar 312 to facilitate one or more of the above actions.

As the navigation bar 312 provides an interface to allow a user to provide user input to navigate from one communication thread to the next, the user interface 303 also includes an input bar 314 that provides an interface to allow a user to compose and send an electronic communication. For example, and as illustrated in FIG. 3A, the input bar 314 can include one or more interface items to allow a user to add files, pictures, and text to an electronic communication to be sent to another user. The input bar 314 may include a text input area 316 that facilitates text input. In addition, the input bar 314 can include an icon menu item 318 that allows a user to access a library of icons. As noted above, one or more of the interface items may be configured to detect a range of user interactions such as, but not limited to: a click, a tap, a double-click, a double-tap, a click-and-hold, a touch-and-hold, etc.

As generally described thus far, FIG. 3A shows one embodiment of an example user interface 303. One will appreciate that other types of user interfaces may be used to implement one or more embodiments of the present invention. For example, FIG. 3A illustrates a viewing area that is conducive to an instant messaging type electronic communication system. Other viewing areas may be used that are conducive to other forms of electronic communication, such as texting, posting, or emailing.

More specifically now, FIGS. 3A-3G will be discussed with respect to the user interface 303 that provides a user with the ability to select, configure, and send a communication element. For example, the input bar 314 can include a selectable item 320 that is associated with a communication element. In particular, and as illustrated in FIG. 3A, the selectable item 320 can visually represent a communication element. In this case, the selectable item 320 represents a communication element that is a "thumbs up" icon. In one or more embodiments of the present invention, a user can choose or select the communication element that is associated with the selectable item 320. In one example embodiment, the communication element is chosen from among a library of communication elements presented upon the user interacting with the icon menu item 318.

Figure 3B:
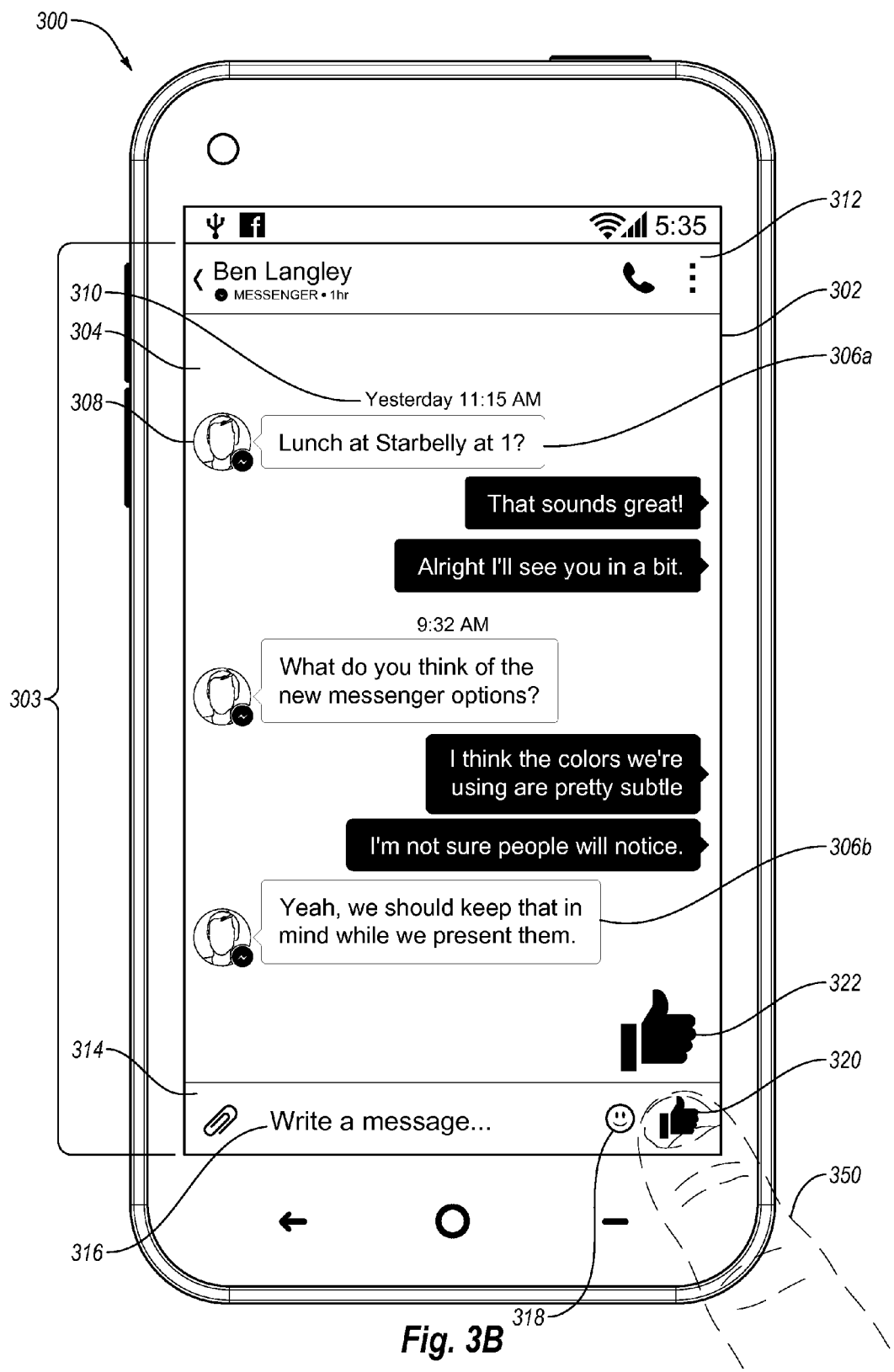
FIG. 3B illustrates an electronic communication user interface with an example communication element in accordance with one or more embodiments.

To begin the process of sending a communication element to one or more users, the user can interact with the selectable item 320. For example, and as illustrated in FIG. 3B, the user can touch the selectable item 320 with the user's finger 350. Upon the user's finger 350 touching the selectable item 320, the user interface 303 can display a communication element 322 within the viewing area 304. For example, the communication system 200 can detect the user interaction with the selectable item 320 and cause the user interface 303 to present the communication element 322. For example, and as illustrated in FIG. 3A, the user interface 303 can present an initial version of the communication element 322.

At this point, the user can determine whether or not the user wishes to further configure the communication element 322 to more accurately express the user's intended message, sentiment, or thought. In one instance, the initial version of the communication element 322 may accurately reflect the user's intended message, sentiment, or thought. In such an instance, the user can cease touching the selectable item 320 and the initial version of the communication element 322 will be sent to the other user (as explained in more detail with respect to FIG. 4A).

Figure 3C:
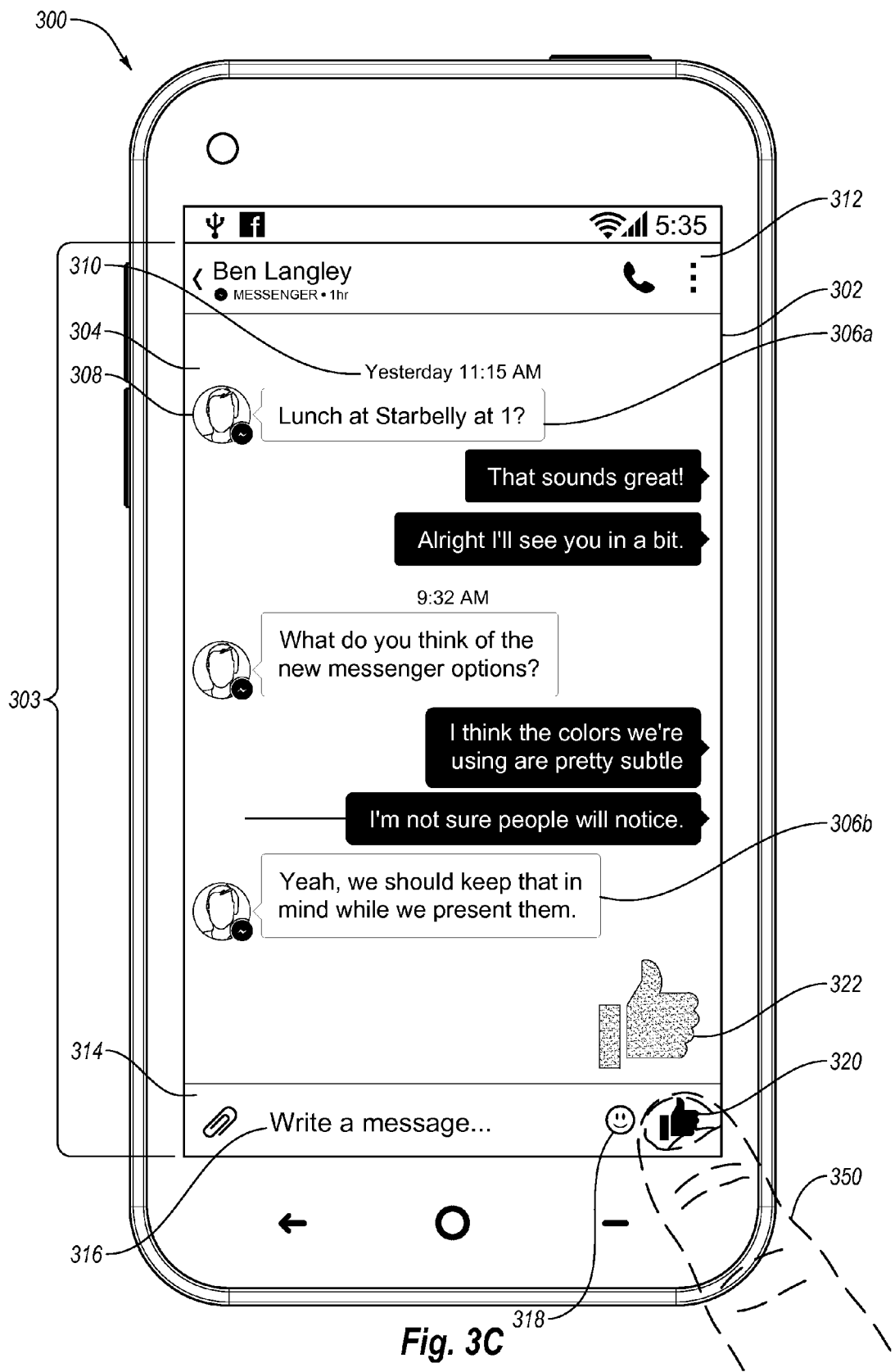
FIG. 3C illustrates an electronic communication user interface with an example configuration of the communication element of FIG. 3B in accordance with one or more embodiments.

The user, however, may desire to configure the communication element 322. In this case, the user can continue to provide a user interaction with respect to the selectable item 320. For example, and as illustrated in FIG. 3C, the user's finger continues to touch the selectable item 320. The communication system 200 can detect the user's ongoing interaction with respect to the selectable item 320. In response, communication system 200 can configure the communication element 322 based on the duration of the user's ongoing interaction with respect to the selectable item 320.

In one embodiment, as illustrated in FIG. 3C, the communication element 322 is washout out, or changes color, to indicate to the user that the communication element 322 is in the process of being configured. The communication system 200 can cause the computing device 300 to provide additional visual, audible, or tactile feedback to the user to indicate that the communication element 322 is being configured, as well as to indicate the extent or degree to which the communication element 322 is being configured. For example, the computing device 300 can continuously vibrate to indicate the ongoing configuring of the communication element 322. Alternatively, the computing device 300 can briefly vibrate at predefined steps within the configuration process of the communication element 322.

In addition to providing tactile feedback to the user, the communication system 200 can cause the computing device 300 to provide audible feedback to the user. For example, during the configuration process, the computing device 300 can provide a continuous sound. The continuous sound can change throughout the configuration process to indicate to the user the degree or extent to which the communication element 322 is being configured. For example, the continuous sound can escalate in pitch or frequency the longer the communication element 322 is configured. Upon reaching a point of max configuration, the computing device 300 can provide a "pop" or other sound to indicate that the communication element 322 has reached a maximum potential configuration, e.g., the message, sentiment, or thought represented by the communication element 322 has reached a maximum emphasis. In alternative embodiments, a series of audible cues can be used to indicate the progress of the communication element 322 configuration process to the user.

In addition, the to tactile or audible feedback, the communication system 200 can cause the computing device 300 to provide visual feedback. In one or more example embodiments, the opacity or color of the communication element 322 can change to indicate that the communication element 322 is being configured.

As discussed above, the communication system 200 can configure or modify the communication element 322 in a variety of ways. One way in which the communication element 322 may be configured is size. For example, returning to FIG. 3C, the communication system 200 has modified or configured communication element 322 to make it bigger compared to the initial communication element illustrated in FIG. 3B. In particular, upon the user providing additional user interaction with respect to the selectable item 320, the communication system 200 can continue to increase the size of the communication element 322.

Figure 3D:
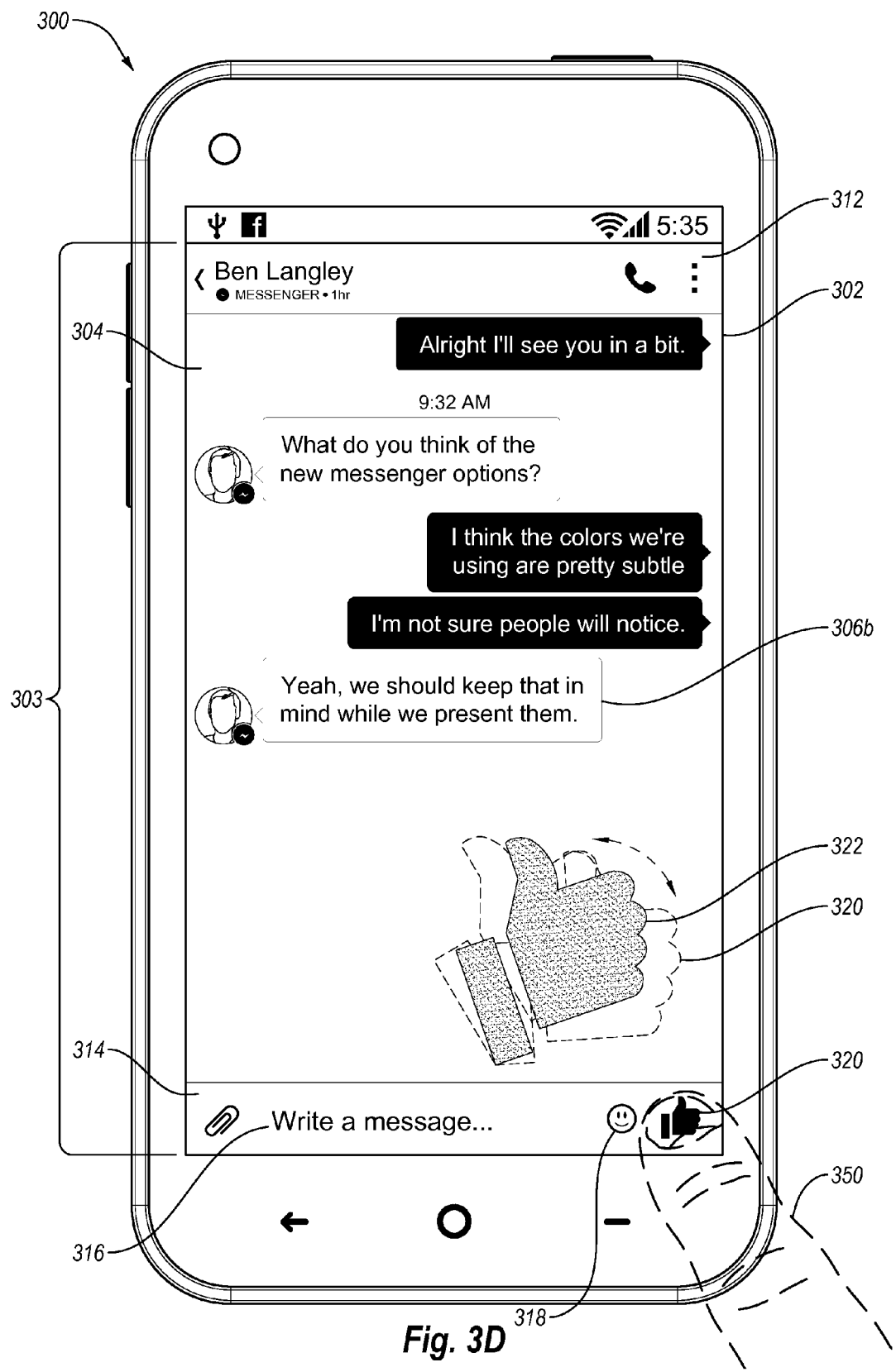
FIG. 3D illustrates an electronic communication user interface with a further example configuration of the communication element of FIG. 3B in accordance with one or more embodiments.

In addition to the size of the communication element, the communication system 200 can also configure other characteristics and features of the communication element 322. For instance, FIG. 3D illustrates an example of the communication element 322 further configured according one or more principles described herein. In particular, FIG. 3D illustrates that the size of the communication element 322 has increased compared to the size of the communication element 322 illustrated in FIG. 3C. In addition, FIG. 3D illustrates that an animation effect 324 has been added to the communication element 322. In particular, the animation effect 324 includes the communication element 322 rotating in a back-and-forth motion, as indicated in FIG. 3D. Additional or alternative animation effects 324 can be added to the communication element 322 as part of the configuration process. For example, an animation effect indicating the thumb going from a "thumbs-down" to a "thumbs-up" position may be added.

Through the configuration process illustrated in FIGS. 3A-3D, the communication system 300 can present a smooth transition in the viewing area 304 from the initial version of the communication element 322 (FIG. 3A) to a final version of a communication element 322 (FIG. 3D). In other words, the user does not see a large jump between one version of the communication element 322 to the next. Rather, from the user's perspective, the configuration process is a continuous and smooth process that is directly correlated with the duration in which the user provides the user interaction with respect to the selectable item 320.

Figure 3E:
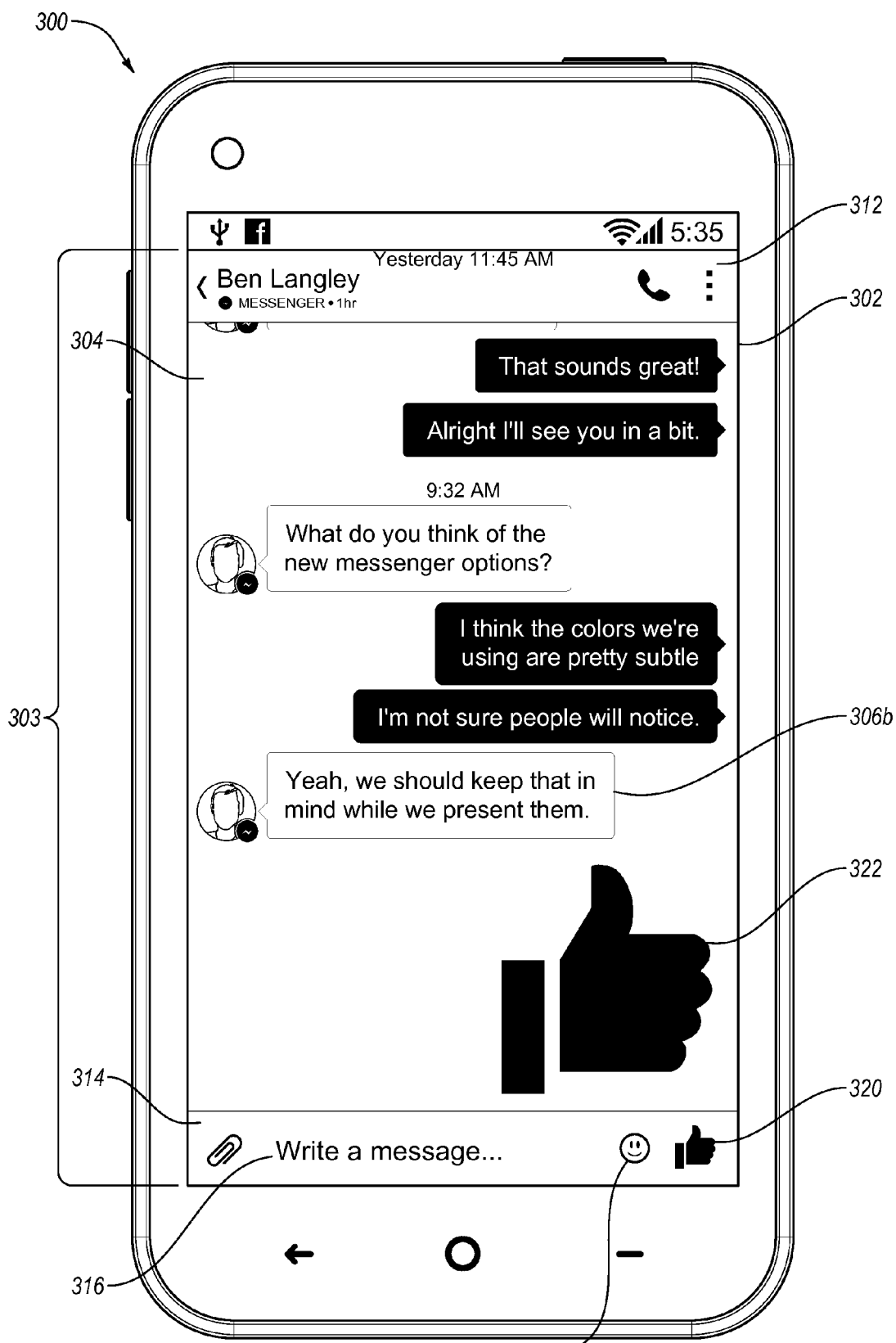
FIG. 3E illustrates an electronic communication user interface with a further example configuration of the communication element of FIG. 3B in accordance with one or more embodiments.

Upon the user seeing the configuration of the communication element 322 that most closely matches the user's intended message, sentiment, or thought, the user can cease to provide the user interaction with respect to the selectable item 320. For example, and as illustrated in FIG. 3E, the user has removed the user's finger 350. The communication system 200, upon detecting the user ceasing to provide the user interaction, can present a final version of the communication element 322 in the viewing area 304 of the user interface 303.

In one example embodiment, upon detecting that the user ceased providing the user interaction with respect to the selectable item 320, the communication system 200 automatically sends the final version of the communication element 322. For example, upon the user lifting the user's finger 350 from the touch screen 302, the final version of the communication element 322 is sent to one or more other users without any additional user input. Alternatively, the communication system 200 may wait on receiving another user interaction (e.g., a user selection of a send button) prior to sending the communication element 322.

Figure 3F:
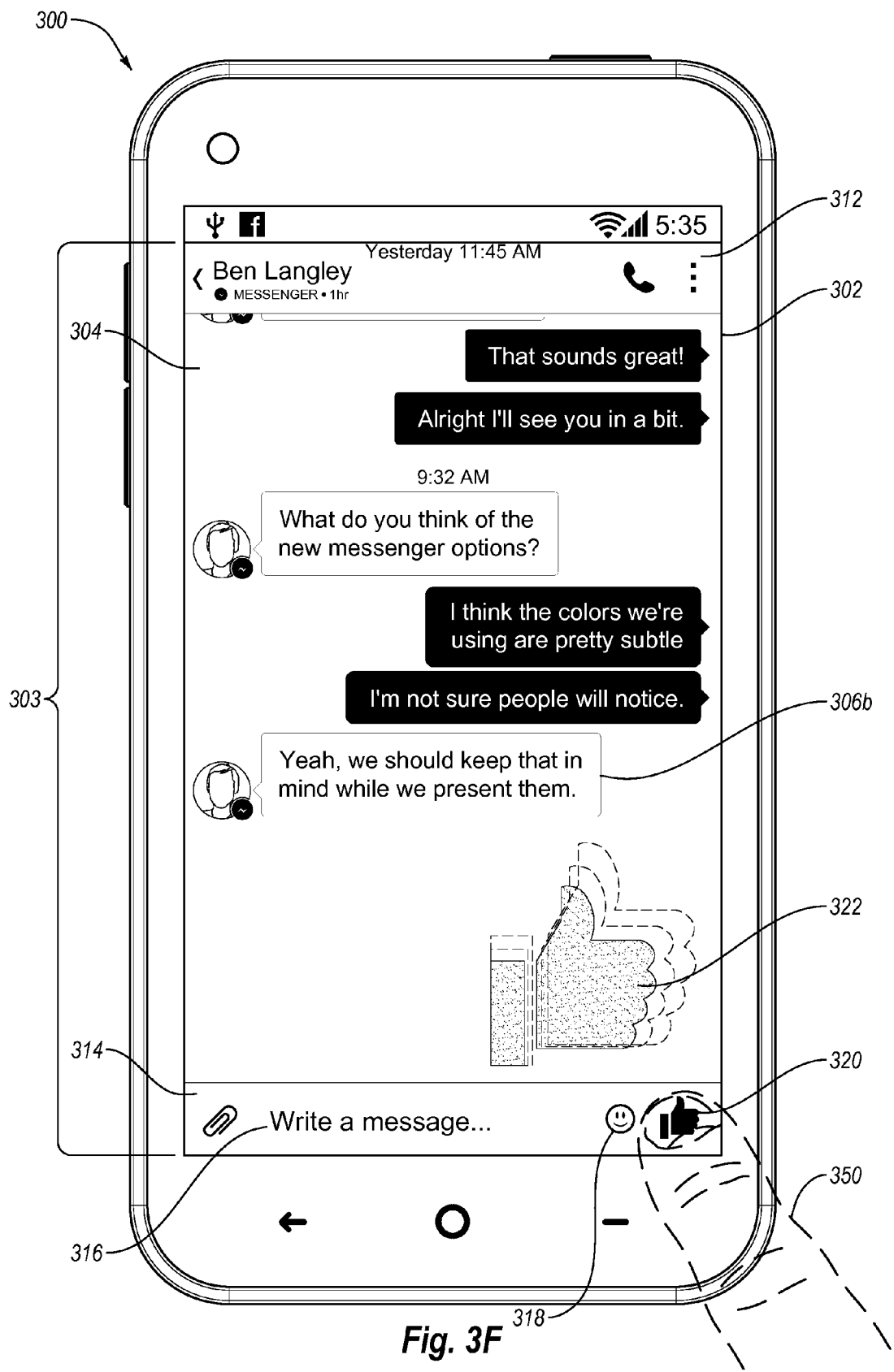
FIG. 3F illustrates an electronic communication user interface with a further example configuration of the communication element of FIG. 3B in accordance with one or more embodiments.
Figure 3G:
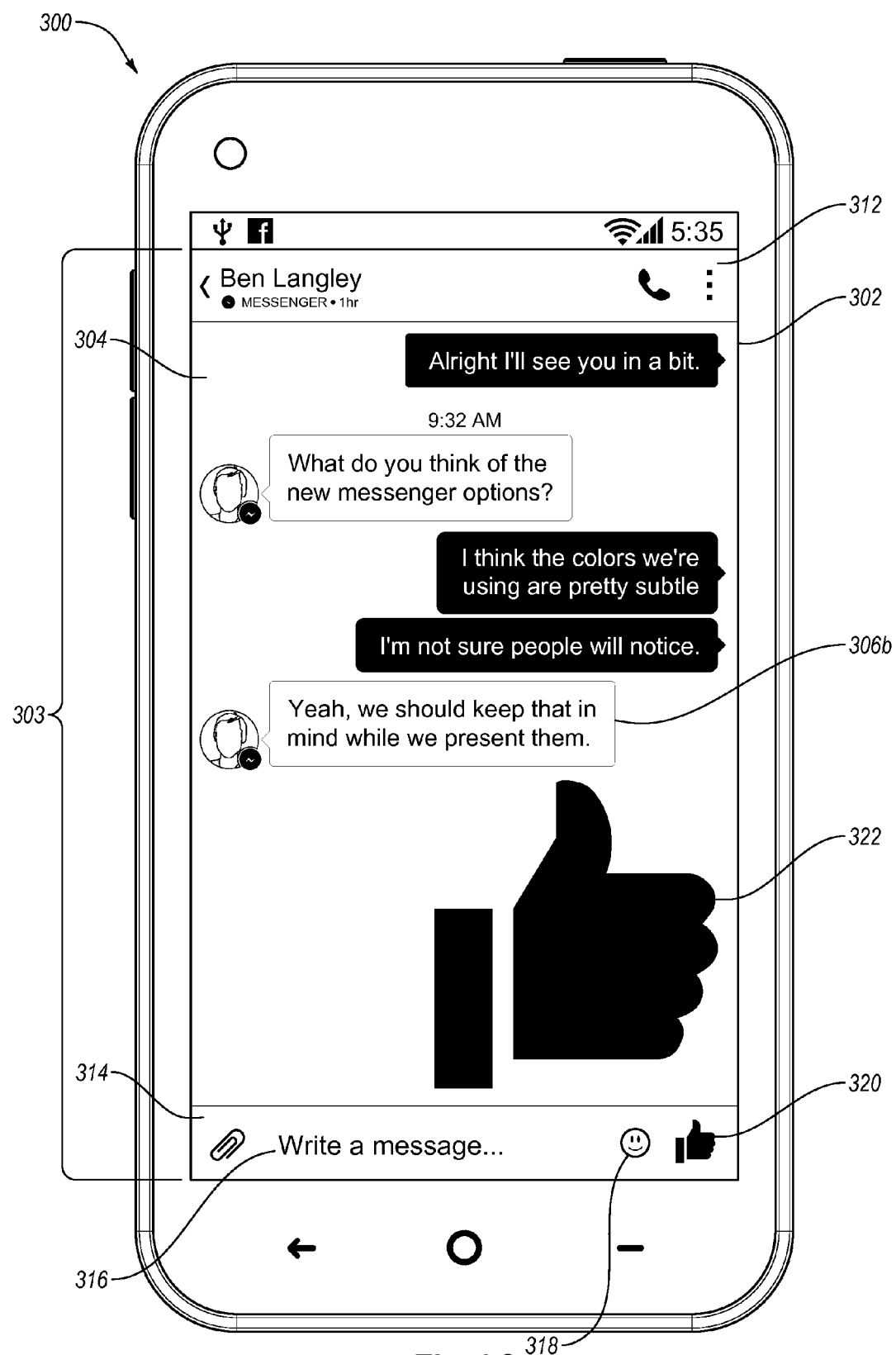
FIG. 3G illustrates an electronic communication user interface with a further example configuration of the communication element of FIG. 3B in accordance with one or more embodiments.

FIGS. 3F and 3G further illustrate one or more configuration examples with respect to communication element 322. For example, FIG. 3F illustrates that the communication element 322 can be associated with various size configurations that enable the user to customize the communication element to correlate with the user's intended message, sentiment, or though. As illustrated in FIG. 3F, the size configuration of the communication element 322 can range from smaller to larger. In turn, the user's intended message can be customized with a range of emphasis on the general expression associated with the communication element 322. For example, the range of emphasis for communication element 322 can be expressed by "OK," "Good," "Great," "Fantastic," and "Best Ever."

Depending on the general expression of a particular communication element 322, the emphasis may indicate different meanings. For example, an alternative communication element may be in the form of a face. The size, and perhaps facial expressions, could range from smaller to larger, for example, from a smaller smile to a larger smile. Thus, the range of the user's intended message could be represented by "Kind of Funny," "Funny," "Really Funny," and "Hilarious." One will appreciate that any communication element 322 can be configured to have a varying degree of emphasis on the underlying general expression associated with the communication element 322.

FIG. 3G illustrates one example of a maximum emphasis for a communication element 322. In particular, the size of the communication element 322 is maximized. In addition, an animation effect, as well as a sound effect may be maximized in correlation with the size maximization of communication element 322 illustrated in FIG. 3G. In one example embodiment, when a maximum emphasis for a communication element 322 is achieved, the communication element 322 is automatically sent to one or more users, regardless if the user has ceased providing the user interaction with the selectable item 320.

Alternatively, if the user continues to provide the user interaction, the communication system 200 can begin the configuration process again. For example, the user may have accidentally skipped over the version of the communication element 322 the user desired to send. Therefore, the user can continue to provide the user interaction and the configuration process eventually loops back to the version of the communication element 322 the user desires to send. In yet a further embodiment, the maximum emphasis configuration of the communication element simply remains presented, but the communication system 200 does not send the communication element 322 until the user ceases to provide the user interaction.

In one or more additional embodiments, the communication system 200 can allow the user to cancel sending the communication element 322 prior to sending. For example, upon the user ceasing to provide the user interaction, the communication system 200 may provide a prompt to the user to either cancel the electronic communication, or to accept the communication element 322 configuration and send the electronic communication with the configured communication element 322. For example, the prompt may include two graphical interface objects, one graphical interface object having the label "Send," and a second graphical interface object having the label "Cancel." In one or more additional embodiments, the prompt can include various other options. For example, the communication system 200 can present an option to "Send w/o Communication Element." In such a case, a user may select this option to send only the part of an electronic communication that does not include the communication element 322.

As described with respect to FIGS. 3A-3G, the user interaction the user provides is a touch-hold-release interaction with respect to the selectable item 320. One will appreciate that the user interaction that selects, configures, and sends the communication element 322 can be any user interaction, or any combination of user interactions with respect to any number of selectable items. For example a tap gesture directed toward the selectable item may select the associated communication element, a pinch gesture directed toward a presented communication element may configure the communication element 322, and a swipe gesture directed toward the configured communication element 322 may send the configured communication element 322 to one or more users.

In the event that the user interaction is something other than the touch-hold-release interaction, the way in which the user interaction is provided can configure the communication element 322. For example, one or more embodiments may use a reverse pinch gesture as the user interaction to configure the communication element 322. In such an embodiment, the wider the user applies the reverse pinch gesture (e.g., the greater the distance between the user's pointer finger and thumb), the greater the extent to which the communication element 322 is configured to emphasize a user sentiment, message or emotion associated with the communication element 322. Thus, not only can the communication element 322 be configured based on time duration of a user interaction, but the communication element 322 can also be configured based on one or more other characteristics of the user interaction, such as the size of a touch gesture, the screen distance involved with the touch gesture (e.g., a distance a user swiped the screen), the a detected number of touch gestures (e.g., a number of times a user tapped the screen), and/or the type of touch gesture.

In one or more embodiments, a final version of the configured communication element 322 is determined based on a determining a final characteristic of the user interaction. For example, a final characteristic of the user interaction can include a total time duration of the user interaction, a total distance/length/width associated with a touch gesture, a total number of user interactions (e.g., taps), and or any other characteristic that is otherwise defined upon the communication system 200 determining that a user is no longer providing a particular user interaction. Thus, the user interface provider 202 can continuously present a configuration of the communication element 322 based on the current characteristic of the user interaction, and then present a final configuration of the communication element 322 based on determining a final characteristic of the user interaction.

Figure 4A:
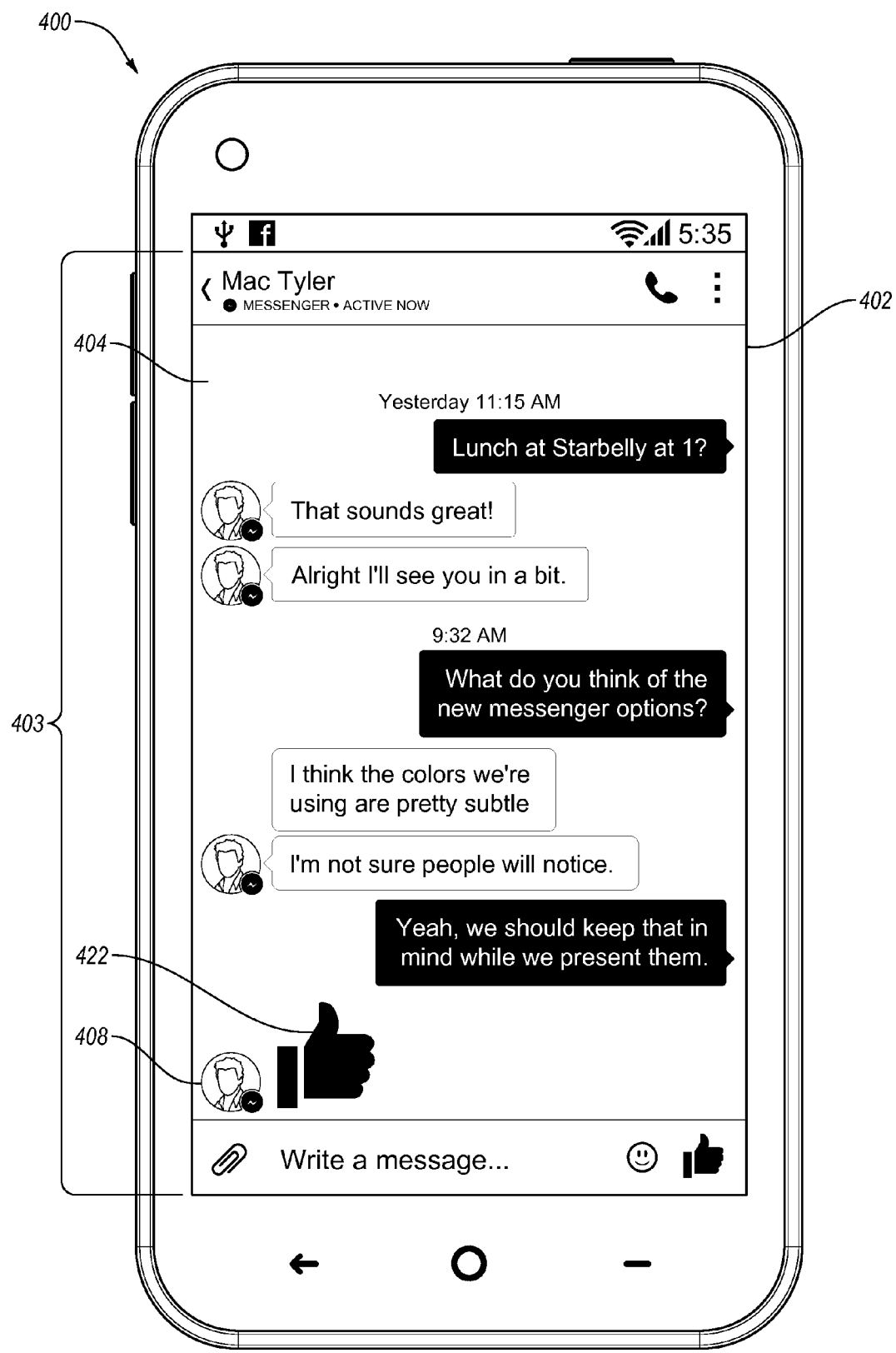
FIG. 4A illustrates an electronic communication user interface with an example configuration of a received communication element of FIG. 3B in accordance with one or more embodiments.
Figure 4B:
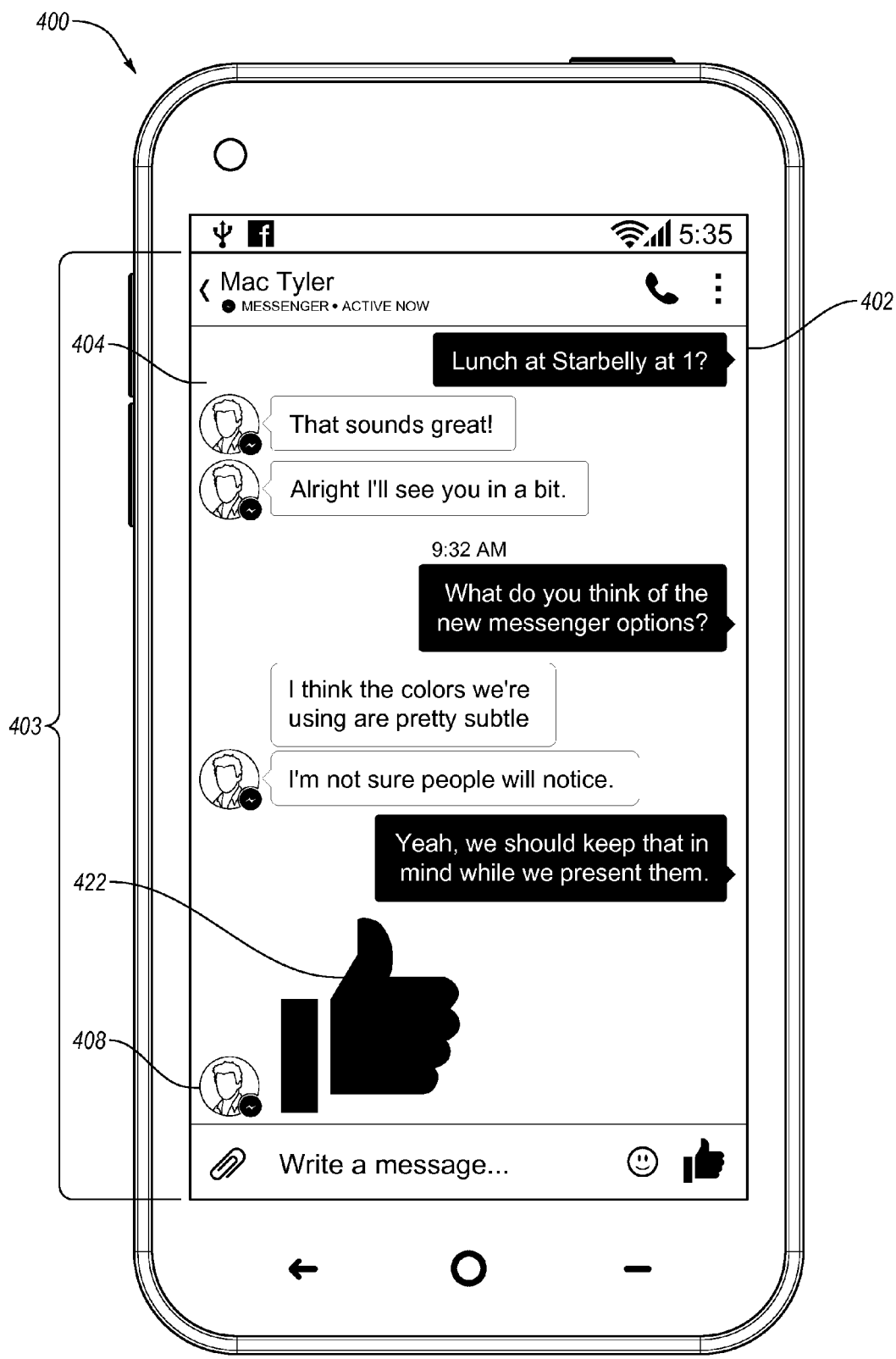
FIG. 4B illustrates an electronic communication user interface with an example configuration of a received communication element of FIG. 3D in accordance with one or more embodiments.
Figure 4C:
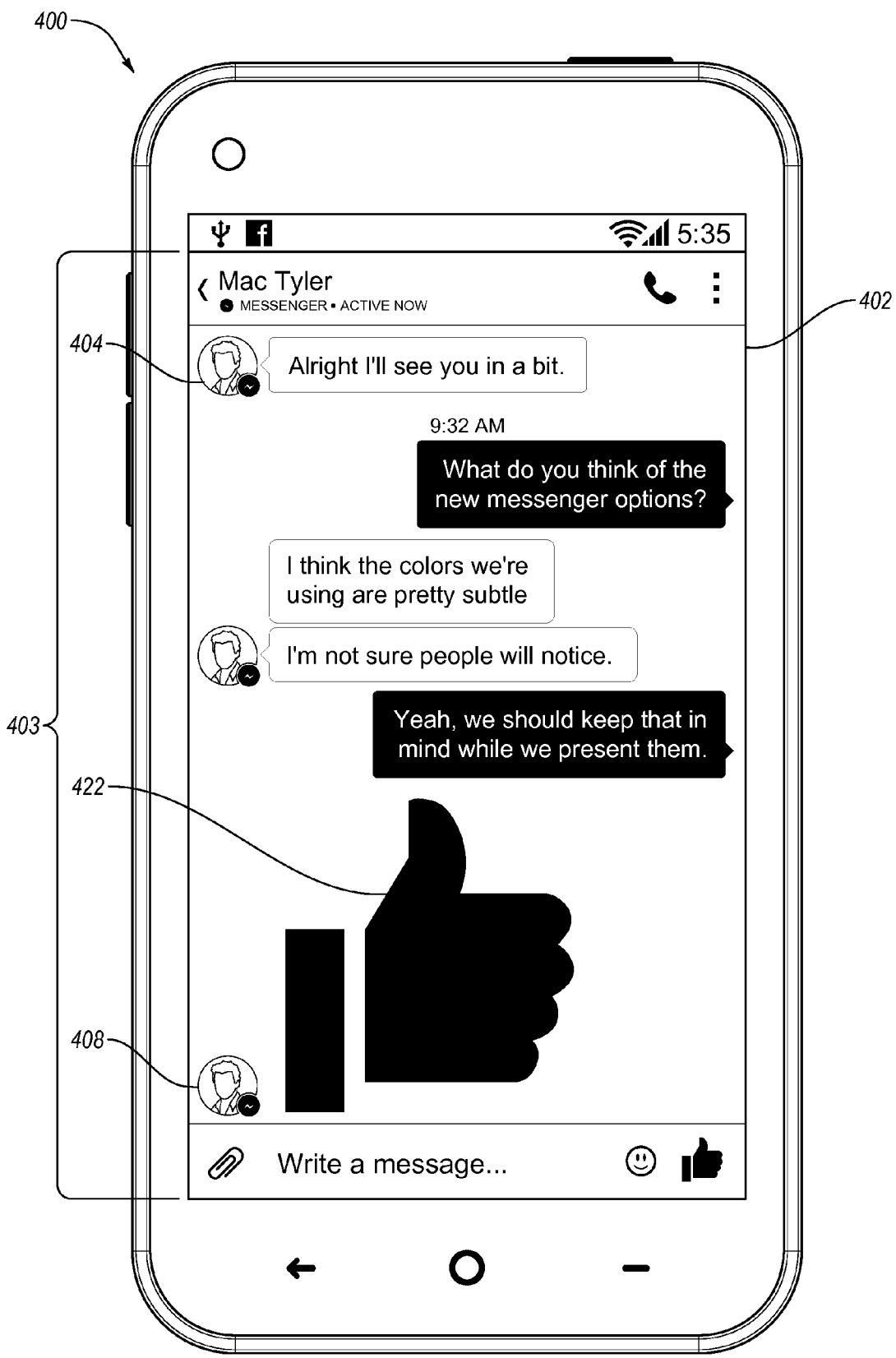
FIG. 4C illustrates an electronic communication user interface with an example configuration of a received communication element of FIG. 3G in accordance with one or more embodiments.

FIGS. 4A-4C illustrate the computing device 400 of the recipient of the communication elements sent from computing device 300. As with computing device 300, computing device 400 includes a touch screen 402 that presents a user interface 403 having a viewing area 404. FIGS. 4A-4C illustrate a range of configured communication elements 422 that are received from the user associated with communication device 300.

For example, FIG. 4A illustrates the receipt of a low-emphasis version of the communication element 422. In particular, the size of the communication element 422 is small. In one example, and as suggested above with respect to FIGS. 3A-3G, the initial version of the communication element 422 may not contain any animation effects and a reduced sound effect.

Moving up in range of emphasis, FIG. 4B illustrates a mid-emphasis version of the communication element 422. As illustrated, the size of the communication element 422 illustrated in FIG. 4B is larger than the size illustrated in 4A. In addition, the communication element 422 illustrated in 4B can include some animation or motion effects, along with increased sound effects.

Finally, FIG. 4C illustrates a high-emphasis version of the communication element 422. For example, FIG. 4C shows that the high-emphasis version of the communication element 422 is oversized to the point that the communication element encompasses a substantial portion of the viewing area 404 compared to other messages. The high-emphasis version of communication element 422 can also include addition animation or motion effects, along with Comparing the low-emphasis communication element illustrated in FIG. 4A with the mid-emphasis and high-emphasis communication elements illustrated in FIGS. 4B and 4C, respectively, one can see the effectiveness in providing a customized communication element that more accurately expresses the user's intended message, sentiment, or thought. In particular, the message, sentiment, or thought expressed through the communication element 422 in FIG. 4A is much different compared to the message, sentiment, or thought expressed through the communication element 422 in FIGS. 4B and 4C. Thus, the communication system 200 described herein allows a user to select, configure, and send communication elements that are customized to express the user's intended message, sentiment or thought.

Figure 5:
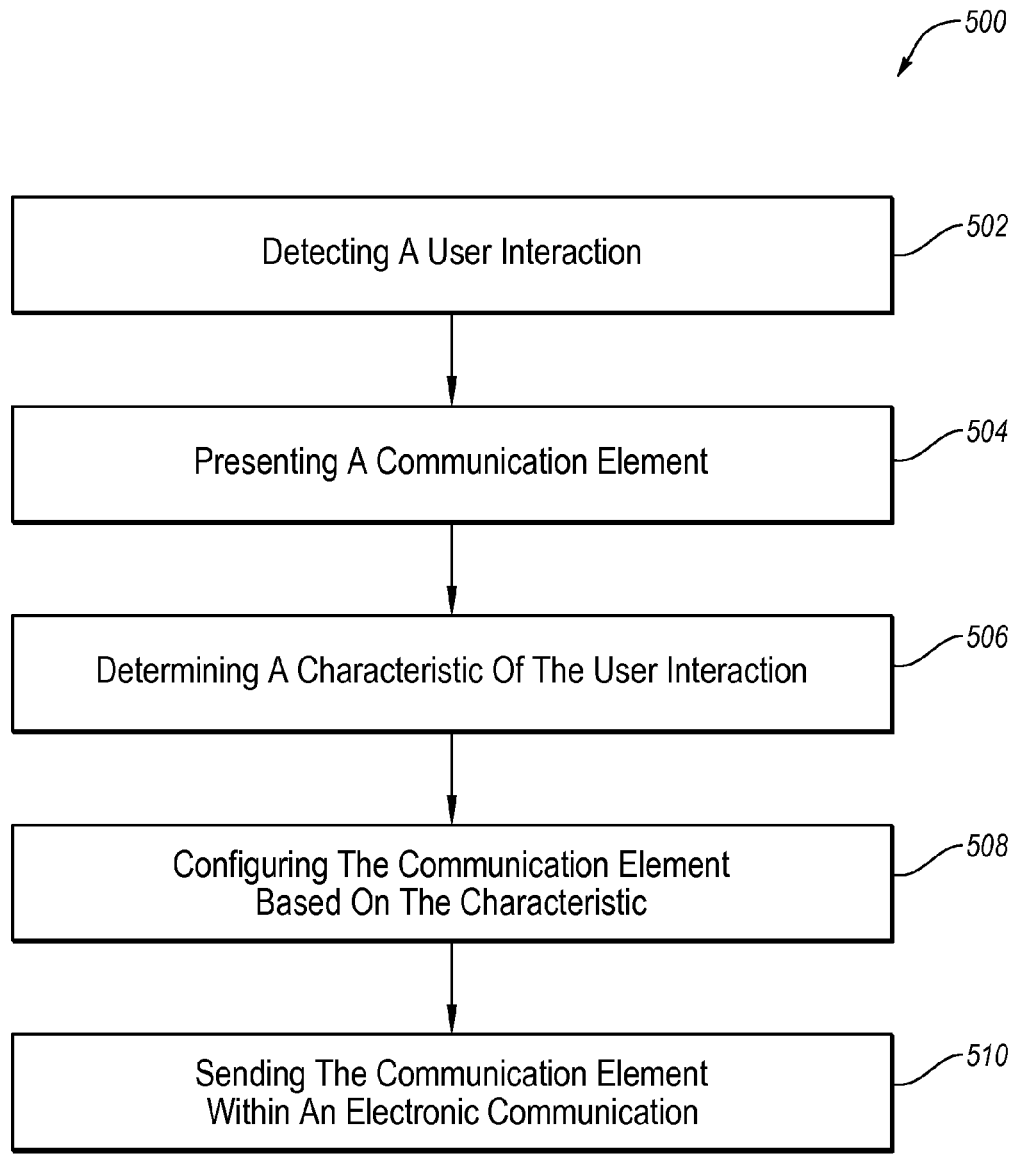
FIG. 5 illustrates a method of composing an electronic communication according to one or more embodiments.
Figure 6:
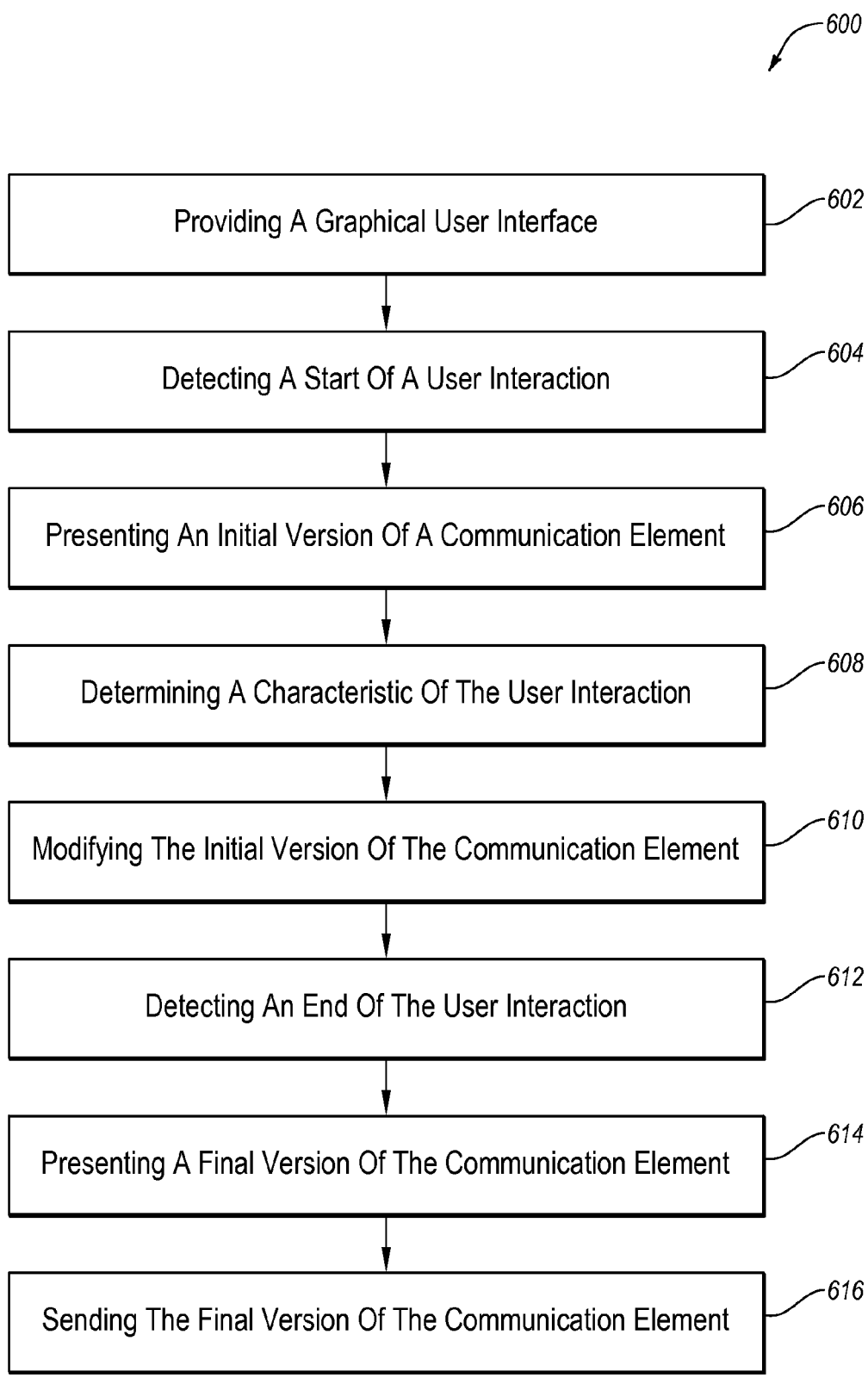
FIG. 6 illustrates another method of composing an electronic communication according to one or more embodiments.

FIGS. 1-4C, the corresponding text, and the examples, provide a number of different systems and devices for using a communication element for electronic communication. In addition to the foregoing, embodiments of the present invention also can be described in terms of flowcharts comprising acts and steps in a method for accomplishing a particular result. For example, FIGS. 5 and 6 illustrate flowcharts of exemplary methods in accordance with one or more embodiments of the present invention. The methods described in relation to FIGS. 5 and 6 may be performed with less or more steps/acts or the steps/acts may be performed in differing orders. Additionally, the steps/acts described herein may be repeated or performed in parallel with one another or in parallel with different instances of the same or similar steps/acts.

FIG. 5 illustrates a flowchart of one example method 500 of configuring a communication element 322 to use within an electronic communication. The method 500 includes an act 502 of detecting a user interaction. In particular, act 502 can involve detecting a user interaction with a graphical user interface 303. For example, act 502 can include the user interface provider 202 providing the user interface 303. In addition, act 502 can include the user input detector 206 detecting a user interaction with a user input device, for example the touch screen 302. The user interaction may include a user touching the selectable item 320.

In addition, method 500 further includes an act 504 of presenting a communication element. In particular, act 504 can include presenting a communication element 322 in response to the detected user interaction. For example, the communication element 322 that is associated with the selectable item 320 can be presented in the viewing area 304 of the user interface 303. In one or more embodiments, the communication element 322 is first presented in an initial configuration. The initial configuration can be a low-emphasis version of the communication element 322.

Method 500 can additionally include an act 506 of determining a characteristic of the user interaction. In particular, the act 506 can include determining a characteristic of the user interaction with the graphical user interface. In one or more embodiments, act 506 can include determining a time period over which the user interaction with the selectable item 320 extends. In one or more embodiments, the user interaction extending over a time period includes a user holding the user's finger 350 in contact with a portion of the touch screen 302 associated with the selectable item 320. Alternatively, or additionally, act 506 can include determining the length of a touch gesture.

Furthermore, the method 500 can also include an act 508 of configuring the communication element based on the characteristic of the user interaction. For example, the communication element controller 208 can lookup a configuration associated with the determined characteristic of the user interaction. The communication element controller 208 can then cause the user interface provider 202 to present one or more configurations of the communication element 322 that are associated with one or more determined time periods. For example, as the determined time period of the user interaction increases, the communication element 322 can continuously change from one configuration to the next in an animated type fashion, thus presenting a substantially real-time configuration of the communication element 322.

Moreover, the method 500 can include an act 510 of sending the communication element within an electronic communication. In particular, act 510 can include sending the configured communication element 322 within an electronic communication. For example, the user input detector 206 can detect that the user interaction ceases with respect to the selectable item 320. Upon detecting the user interaction ceases, the communication manager 204 can arrange for sending the configured communication element 322 in an electronic communication to another user. In one or more embodiments, the electronic communication is an instant message, text message, post, or other form of electronic communication.

Referring now to FIG. 6, a flowchart of another example method 600 of configuring a communication element 322 to use within an electronic communication is illustrated. As shown, method 600 can include an act 602 of providing a graphical user interface 303. In particular, the act 602 can include providing a graphical user interface 303 comprising a viewing area 304 comprising a plurality of electronic communications 306 between a user and one or more other users. In addition, the act 602 can include providing a graphical user interface 303 comprising a selectable item 320. In one or more embodiments, the selectable item 320 can be associated with a communication element 322.

The method 600 can also include an act 604 of detecting a start of a user interaction. In particular, the act 604 can include detecting a start of a user interaction with respect to the selectable item 320. For example, the start of a user interaction can include a user touching the touch screen 302 on the computing device 300.

Additionally, the method 600 can include an act 606 of presenting an initial version of a communication element 322. In particular, act 606 can include presenting an initial version of the communication element 322 within the viewing area 304 in response to detecting the starting point of the user interaction. In one example, the initial version of the communication element 322 is a low-emphasis version of the communication element 322.

Furthermore, the method 600 can include an act 608 of determining a characteristic of the user interaction. In particular, the act 608 can include determining a characteristic of the user interaction with respect to the selectable item 320. In one example embodiment, a determination is made of the duration in which a user continues to touch the selectable item 320. For example, the user interaction may include a touch-hold-release gesture as explained above. Alternatively, the characteristic of the user interaction can include the length of a touch gesture, the type of a touch gesture, and/or the number of times a touch gesture is detected.

Method 600 can further include an act 610 of modifying the initial version of the communication element 322. In particular, the act 610 can include modifying the initial version of the communication element 322 with one or more modifications, wherein the one or more modifications of the communication element 322 are based on the characteristic of the user interaction. For example, modifying the initial version of the communication element 322 may include modifying the size, shape, color, opacity, and/or one or more additional characteristics of the initial version of the communication element 322, as discussed above. In addition, modifying the initial version of the communication element 322 may include adding or removing one or more characteristics to the initial version of the communication element 322.

In addition, the method 600 can further include an act 612 of detecting an end of the user interaction. In particular, act 612 can include detecting an end of the user interaction with respect to the selectable item 320, wherein the start and the end of the user interaction define a final characteristic of the user interaction with respect to the selectable item 320. In one example embodiment, detecting the end of the user interaction with respect to the selectable item 320 includes detecting that the user is no longer touching the touch screen 302 of the computing device 300. In one or more alternative embodiments, a final characteristic can include determining a total length of a touch gesture. For example, in the event the touch gesture associated with configuring the communication element is a reverse pinch, the total width of the reverse pinch is the final characteristic.

The method 600 can further include an act 614 of presenting a final version of the communication element 322. In particular, the act 614 can include presenting a final version of the communication element 322 based on the total duration of the user interaction. For example, the communication element controller 208 can determine the final version of the communication element 322 using the time of the total duration of the user interaction, or in other words, the final version of the communication element 322 is determined, at least in part, by the amount of time the user continues to touch the portion of the touch screen 302 associated with the selectable item 320.

Furthermore, the method 600 can also include an act 616 of sending the final version of the communication element 322. In particular, the act 616 can include, in response to detecting the ending point of the user interaction, sending the final version of the communication element to the one or more other users. For example, upon the user input detector 206 detecting that the user has ended the user interaction (e.g., lifted the user's finger 350 away from the touch screen 302), the communication manager 204 can cause an electronic communication that includes the final version of the communication element 322 to be sent to another user.

Figure 7:
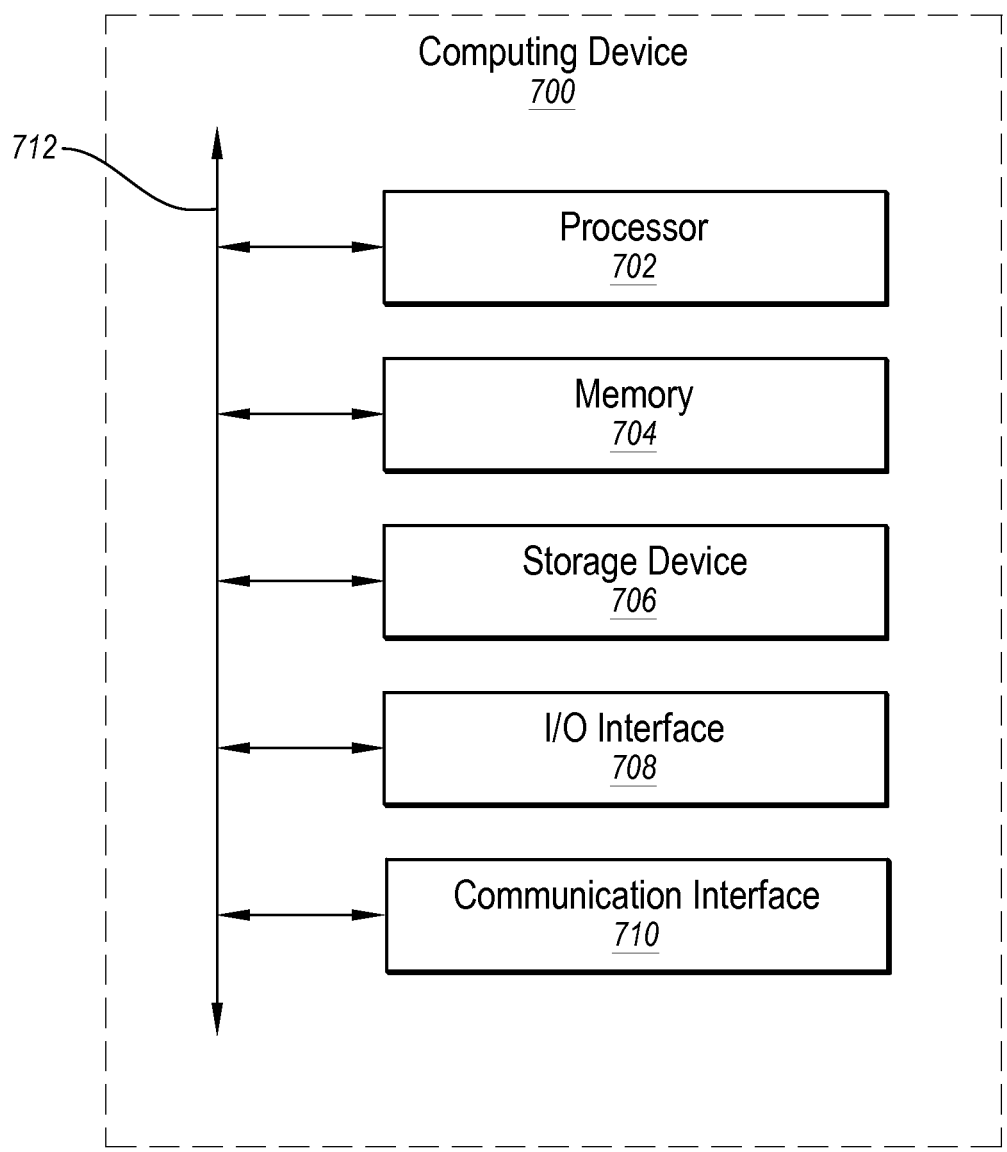
FIG. 7 illustrates a block diagram of a computing device according to one or more embodiments.

FIG. 7 illustrates, in block diagram form, an exemplary computing device 700 that may be configured to perform one or more of the processes described above. One will appreciate that system 100, computing devices 102, 104, sever 108, and/or system 200 each comprise one or more computing devices in accordance with implementations of computing device 700. As shown by FIG. 7, the computing device can comprise a processor 702, a memory 704, a storage device 706, an I/O interface 708, and a communication interface 710, which may be communicatively coupled by way of communication infrastructure 712. While an exemplary computing device 700 is shown in FIG. 7, the components illustrated in FIG. 7 are not intended to be limiting. Additional or alternative components may be used in other embodiments. Furthermore, in certain embodiments, a computing device 700 can include fewer components than those shown in FIG. 7. Components of computing device 700 shown in FIG. 7 will now be described in additional detail.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage device 706 and decode and execute them. In particular embodiments, processor 702 may include one or more internal caches for data, instructions, or addresses. As an example and not by way of limitation, processor 702 may include one or more instruction caches, one or more data caches, and one or more translation lookaside buffers (TLBs). Instructions in the instruction caches may be copies of instructions in memory 704 or storage 706.

Memory 704 may be used for storing data, metadata, and programs for execution by the processor(s). Memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 704 may be internal or distributed memory.

Storage device 706 includes storage for storing data or instructions. As an example and not by way of limitation, storage device 706 can comprise a non-transitory storage medium described above. Storage device 706 may include a hard disk drive (HDD), a floppy disk drive, flash memory, an optical disc, a magneto-optical disc, magnetic tape, or a Universal Serial Bus (USB) drive or a combination of two or more of these. Storage device 706 may include removable or non-removable (or fixed) media, where appropriate. Storage device 706 may be internal or external to the computing device 700. In particular embodiments, storage device 706 is non-volatile, solid-state memory. In other embodiments, Storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 708 allows a user to provide input to, receive output from, and otherwise transfer data to and receive data from computing device 700. I/O interface 708 may include a mouse, a keypad or a keyboard, a touch screen, a camera, an optical scanner, network interface, modem, other known I/O devices or a combination of such I/O interfaces. I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interface 708 is configured to provide graphical data to a display for presentation to a user. The graphical data may be representative of one or more graphical user interfaces and/or any other graphical content as may serve a particular implementation.

Communication interface 710 can include hardware, software, or both. In any event, communication interface 710 can provide one or more interfaces for communication (such as, for example, packet-based communication) between computing device 700 and one or more other computing devices or networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Communication infrastructure 712 may include hardware, software, or both that couples components of computing device 700 to each other. As an example and not by way of limitation, communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, system 200 may be linked to and/or implemented within a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social-networking system. A user may be an individual (human user), an entity (e.g., an enterprise, business, or third party application), or a group (e.g., of individuals or entities). A user node corresponding to a user may comprise information provided by the user and information gathered by various systems, including the social-networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social-networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social-networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social-networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social-networking system may construct a web page (or a structured document) of a concept node (e.g., a restaurant, a celebrity), incorporating one or more selectable buttons (e.g., "like", "check in") in the web page. A user can access the page using a web browser hosted by the user's client device and select a selectable button, causing the client device to transmit to the social-networking system a request to create an edge between a user node of the user and a concept node of the concept, indicating a relationship between the user and the concept (e.g., the user checks in to a restaurant, or the user "likes" a celebrity).

As an example, a user may provide (or change) his or her city of residence, causing the social-networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social-networking system may support a variety of applications, such as photo sharing, on-line calendars and events, gaming, instant messaging, and advertising. For example, the social-networking system may also include media sharing capabilities. Also, the social-networking system may allow users to post photographs and other multimedia files to a user's profile page (typically known as "wall posts" or "timeline posts") or in a photo album, both of which may be accessible to other users of the social-networking system depending upon the user's configured privacy settings. The social-networking system may also allow users to configure events. For example, a first user may configure an event with attributes including time and date of the event, location of the event and other users invited to the event. The invited users may receive invitations to the event and respond (such as by accepting the invitation or declining it). Furthermore, the social-networking system may allow users to maintain a personal calendar. Similarly to events, the calendar entries may include times, dates, locations and identities of other users.

Figure 8:
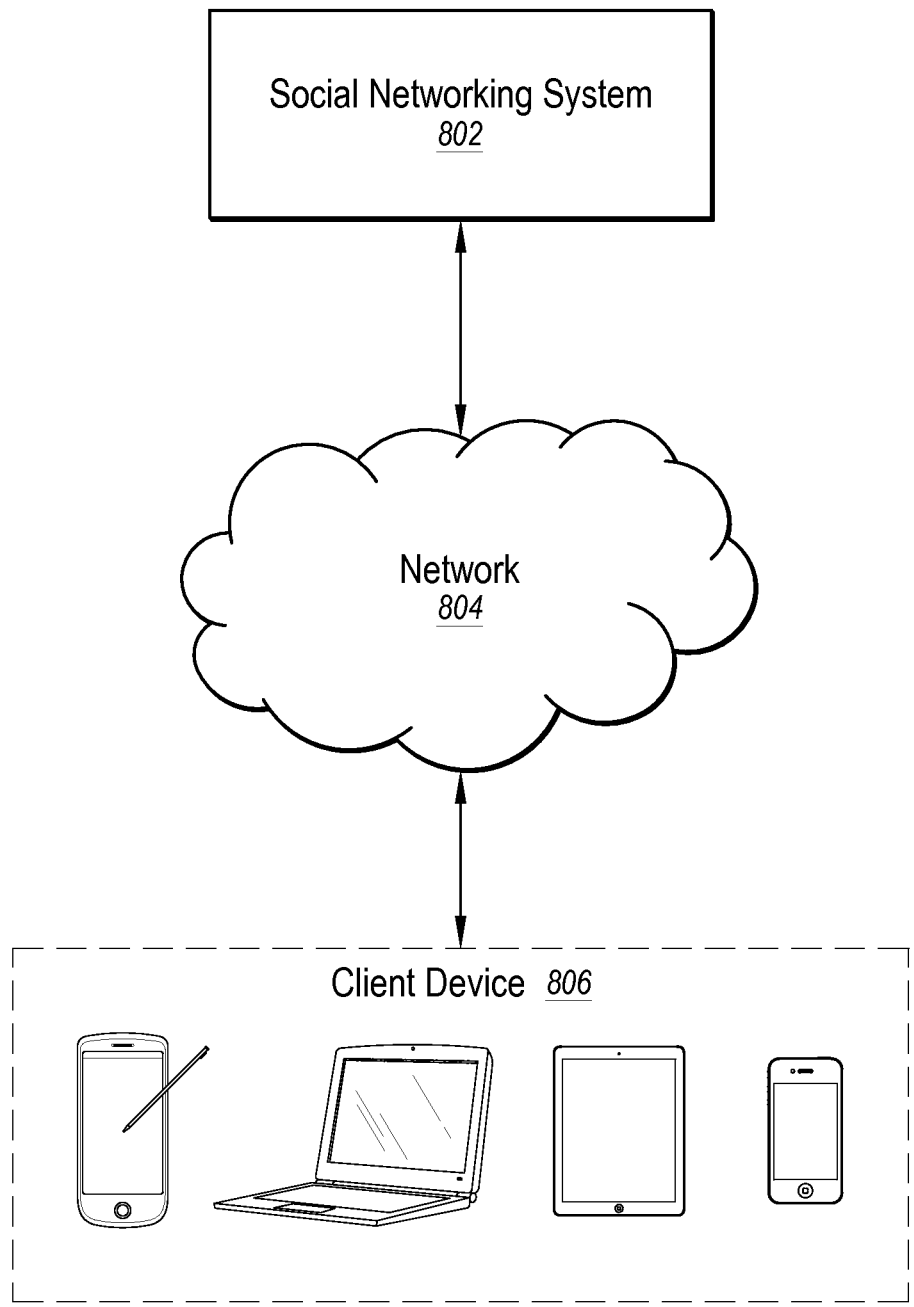
FIG. 8 illustrates a network environment of a social-networking system according one or more embodiments.

FIG. 8 illustrates an example network environment of a social-networking system. In particular embodiments, a social-networking system 802 may comprise one or more data stores. In particular embodiments, the social-networking system 802 may store a social graph comprising user nodes, concept nodes, and edges between nodes as described earlier. Each user node may comprise one or more data objects corresponding to information associated with or describing a user. Each concept node may comprise one or more data objects corresponding to information associated with a concept. Each edge between a pair of nodes may comprise one or more data objects corresponding to information associated with a relationship between users (or between a user and a concept, or between concepts) corresponding to the pair of nodes.

In particular embodiments, the social-networking system 802 may comprise one or more computing devices (e.g., servers) hosting functionality directed to operation of the social-networking system 802. A user of the social-networking system 802 may access the social-networking system 802 using a client device such as client device 806. In particular embodiments, the client device 806 can interact with the social-networking system 802 through a network 804.

The client device 806 may be a desktop computer, a laptop computer, a tablet computer, a personal digital assistant (PDA), an in- or out-of-car navigation system, a smart phone or other cellular or mobile phone, or a mobile gaming device, other mobile device, or other suitable computing devices. Client device 806 may execute one or more client applications, such as a web browser (e.g., Microsoft Windows Internet Explorer, Mozilla Firefox, Apple Safari, Google Chrome, Opera, etc.) or a native or special-purpose client application (e.g., Facebook for iPhone or iPad, Facebook for Android, etc.), to access and view content over network 804.

Network 804 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 806 may access the social-networking system 802.

While these methods, systems, and user interfaces utilize both publicly available information as well as information provided by users of the social-networking system, all use of such information is to be explicitly subject to all privacy settings of the involved users and the privacy policy of the social-networking system as a whole.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A method comprising:
    detecting a single user input received via a graphical user interface;
    presenting, within the graphical user interface, a communication element in response to the detected single user input;
    configuring, by at least one processor, the communication element based on a continued detection of the detected single user input, wherein configuring the communication element comprises applying an animation effect to the communication element that animates a configuration change of the communication element during the continued detection of the single user input, wherein a duration of the continued detection of the single user input associates the animation effect with the communication element for presentation to a recipient of the communication element; and
    in response to detecting an ending of the single user input, sending the configured communication element within an electronic communication to a recipient client device, wherein the electronic communication causes the recipient client device to present the animation effect that animates the configuration change of the communication element on the recipient client device.

2. The method of claim 1, wherein:
    the graphical user interface comprises a viewing area and a selectable item; and detecting the single user input comprises detecting a touch gesture directed toward the selectable item.

3. The method of claim 2, wherein presenting the communication element in response to the detected single user input comprises presenting the communication element within the viewing area of the graphical user interface.

4. The method of claim 1, further comprising detecting that the single user input has ended.

5. The method of claim 1, wherein applying the animation effect to the communication element comprises presenting an animation that indicates modifying one or more characteristics of the communication element.

6. The method of claim 1, wherein the single user input comprises:
selecting a selectable item presented in association with the graphical user interface;
holding the selectable item for a time period; and
releasing the selectable item.

7. The method of claim 1, wherein configuring the communication element comprises changing the size of the communication element from a smaller size to a larger size.

8. The method of claim 1, comprising changing the opacity of the communication element while configuring the communication element.

9. A mobile device, comprising:
at least one processor;
at least one non-transitory computer readable storage medium storing instructions thereon that, when executed by the at least one processor, cause the mobile device to:
detect a single user input received via a graphical user interface;
present, within the graphical user interface, a communication element in response to the detected single user input;
configure the communication element based on a continued detection of the detected single user input, wherein configuring the communication element comprises applying an animation effect to the communication element that animates a configuration change of the communication element during the continued detection of the single user input, wherein a duration of the continued detection of the single user input associates the animation effect with the communication element for presentation to a recipient of the communication element; and
in response to detecting an ending of the single user input, send the configured communication element within an electronic communication to a recipient client device, wherein the electronic communication causes the recipient client device to present the animation effect that animates the configuration change of the communication element on the recipient client device.

10. The mobile device of claim 9, further comprising instructions that, when executed by the at least one processor, cause the mobile device to detect that the single user input has ended.

11. The mobile device of claim 10, further comprising instructions that, when executed by the at least one processor, cause the mobile device to provide a selectable item within the graphical user interface, wherein the single user input is directed toward the selectable item.

12. The mobile device of claim 11, wherein applying the animation effect to the communication element further comprises presenting an animation that indicates modifying the communication element to emphasize a message, a sentiment, or a thought associated with communication element.

13. The mobile device of claim 12, wherein presenting the animation that indicates modifying the communication element comprises providing the animation for a length of time that is directly proportional to a time period over which the single user input extends.

14. The mobile device of claim 13, wherein modifying the communication element comprises changing the size of the communication element.

15. The mobile device of claim 14, wherein modifying the communication element comprises adding a sound effect to the communication element.

16. A method comprising:
providing a graphical user interface comprising:
a viewing area comprising a plurality of electronic communications between a user and one or more other users; and
a selectable item associated with a communication element;
receiving a single user input based on a user interaction with respect to the selectable item;
detecting a start of the single user input with respect to the selectable item;
presenting an initial version of the communication element within the viewing area in response to detecting the start of the single user input;
configuring the initial version of the communication element based on a continued detection of the single user input, wherein configuring the initial version of the communication element comprises applying an animation effect that animates a configuration change of the initial version of the communication element to a final version of the communication element during the continued detection of the single user input, wherein a duration of the continued detection of the single user input associates the animation effect with the communication element for presentation to a recipient of the communication element; and
in response to detecting an end of the single user input, sending the communication element within an electronic communication to the one or more recipient client devices, wherein the electronic communication causes the one or more recipient client devices to present the animation effect that animates the configuration change of the initial version of the communication element to the final version of the communication element.

17. The method of claim 16, wherein applying the animation effect further comprises presenting an animation that indicates modifying the communication element to emphasize a message, a sentiment, or a thought associated with the communication element.

18. The method of claim 17, wherein presenting the animation that indicates modifying the communication element comprises providing the animation for a length of time that is directly proportional to an ongoing duration of the single user input.

19. The method of claim 18, wherein modifying the initial version of the communication element further comprises increasing or decreasing the size of the communication element.

20. The method as recited in claim 16, further comprising providing the presentation of the animation that indicates modifying the communication element within the viewing area of the graphical user interface, wherein the viewing area of the graphical user interface comprises a communication thread between the user and one or more other users.

\* \* \* \* \*